US011272015B2

(12) United States Patent
Thum et al.

(10) Patent No.: US 11,272,015 B2
(45) Date of Patent: Mar. 8, 2022

(54) FUNCTION-AS-A-SERVICE FOR TWO-WAY COMMUNICATION SYSTEMS

(71) Applicant: LIVEPERSON, INC., New York, NY (US)

(72) Inventors: Christian Thum, Mannheim (DE); Robert Reiz, Mannheim (DE); Alan Gilchrest, Seattle, WA (US); Andreas Rotaru, Mannheim (DE); Simon Pelczer, Mannheim (DE)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/119,445

(22) Filed: Dec. 11, 2020

(65) Prior Publication Data

US 2021/0194971 A1 Jun. 24, 2021

Related U.S. Application Data

(60) Provisional application No. 62/948,038, filed on Dec. 13, 2019.

(51) Int. Cl.
*G06Q 40/04* (2012.01)
*H04L 67/141* (2022.01)
(Continued)

(52) U.S. Cl.
CPC .......... *H04L 67/141* (2013.01); *H04L 67/10* (2013.01); *H04M 3/5183* (2013.01)

(58) Field of Classification Search
CPC ........ G06F 8/60; G06F 9/4856; G06F 9/4881; G06F 9/5005; G06F 9/5027; G06F 9/5055; G06F 9/5072; G06F 9/541; G06F 9/6267; G06F 11/3466; G06F 3/167; G06F 9/445; G06F 9/44521; G06F 16/2379; G06F 8/35; G06F 9/542; G06F 16/1847;
(Continued)

(56) References Cited

U.S. PATENT DOCUMENTS 6,574,197 B1\* 6/2003 Kanamaru .......... H04L 43/0817
370/230
9,424,075 B1\* 8/2016 Halim .................... G06F 9/5038
(Continued)

OTHER PUBLICATIONS

International Search Report and Written Opinion for PCT Application No. PCT/US2020/064532 dated Apr. 6, 2021, 13 pages.
(Continued)

*Primary Examiner* — Gerald Gauthier
(74) *Attorney, Agent, or Firm* — Polsinelli LLP

(57) ABSTRACT

The present disclosure relates generally to systems and methods for facilitating two-way communication sessions using serverless cloud-based functions configured in a function-as-a-service (FaaS) system. One example includes accessing a template configured to execute a response based on an event, facilitating a two-way communication session with a user device, and processing data of the two-way communication session to identify an event trigger corresponding to the template. Execution of a serverless cloud-based function associated with the event trigger is requested, and one or more outputs of the serverless cloud-based function associated with the event trigger are integrated into the two-way communication session.

24 Claims, 20 Drawing Sheets

(51) Int. Cl.
*H04L 67/10* (2022.01)
*H04M 3/51* (2006.01)

(58) Field of Classification Search
CPC .... G06F 16/319; G06F 21/6245; G06F 21/80; G06F 40/30; G06F 40/35; G06Q 40/04; H04L 12/1831; H04L 41/145; H04L 41/5019; H04L 41/5025; H04L 41/5051; H04L 43/0805; H04L 51/02; H04L 63/0428; H04L 63/1408; H04L 67/02; H04L 67/06; H04L 67/10; H04L 67/141; H04L 67/2809; H04L 67/2833; H04L 67/32; H04L 67/36; H04L 67/40; H04L 69/22; H04L 41/5096; H04L 9/3247; H04L 63/0281; H04L 65/4076; H04M 3/5183; H04M 3/2281; H04W 12/068; H04W 36/00835; H04W 4/21; H04W 12/66; G06N 3/0454; G06K 9/6289; G16H 20/60; H05B 47/105
USPC .......... 709/227, 226, 203; 370/252; 340/679
See application file for complete search history.

(56) References Cited

U.S. PATENT DOCUMENTS

| | | | |
|---|---|---|---|
| 9,641,676 B1* | 5/2017 | Mandic | H04M 3/42221 |
| 9,736,203 B2* | 8/2017 | Dasgupta | H04L 65/4076 |
| 10,078,489 B2* | 9/2018 | Kannan | H04L 65/1069 |
| 10,541,938 B1* | 1/2020 | Timmerman | H04L 43/065 |
| 10,547,522 B2* | 1/2020 | Hutchison | H04L 41/069 |
| 10,649,861 B1* | 5/2020 | Natanzon | G06F 11/302 |
| 10,671,360 B1* | 6/2020 | Todd | G06F 11/3466 |
| 10,673,973 B2* | 6/2020 | Baig | H04L 67/2833 |
| 10,826,968 B1* | 11/2020 | Ramaswamy | G06F 16/173 |
| 10,986,184 B1* | 4/2021 | Seymour | H04L 9/3239 |
| 2011/0047272 A1* | 2/2011 | Bosneag | H04L 41/042 709/226 |
| 2011/0202594 A1* | 8/2011 | Ricci | H04M 3/44 709/203 |
| 2012/0179827 A1* | 7/2012 | Xue | H04L 65/1069 709/227 |
| 2016/0012707 A1* | 1/2016 | McKinley | G08B 21/187 340/679 |
| 2016/0134558 A1* | 5/2016 | Steinder | H04L 67/16 709/226 |
| 2016/0328577 A1* | 11/2016 | Howley | G06F 1/3215 |
| 2018/0034924 A1* | 2/2018 | Horwood | H04L 67/16 |
| 2018/0254998 A1* | 9/2018 | Cello | H04L 41/5009 |
| 2018/0321922 A1 | 11/2018 | Balasubramanian et al. | |
| 2018/0322403 A1 | 11/2018 | Ron et al. | |
| 2019/0028552 A1* | 1/2019 | Johnson, II | H04L 67/02 |
| 2019/0041960 A1* | 2/2019 | Guim Bernat | H04L 41/5051 |
| 2019/0044918 A1* | 2/2019 | Doshi | G06N 3/08 |
| 2019/0045037 A1* | 2/2019 | Sukhomlinov | H04L 67/40 |
| 2019/0045207 A1* | 2/2019 | Chen | G06K 9/72 |
| 2019/0079744 A1* | 3/2019 | Bosch | G06F 8/60 |
| 2019/0082004 A1* | 3/2019 | Bosch | G06F 8/60 |
| 2019/0108419 A1* | 4/2019 | Coven | G06F 9/44505 |
| 2019/0123973 A1* | 4/2019 | Jeuk | G06N 20/00 |
| 2019/0132932 A1* | 5/2019 | Klecha | H05B 45/60 |
| 2019/0141536 A1* | 5/2019 | Bachmutsky | H04W 12/08 |
| 2019/0158606 A1* | 5/2019 | Guim Bernat | H04W 4/40 |
| 2019/0179678 A1* | 6/2019 | Banerjee | G06F 9/5072 |
| 2019/0190995 A1 | 6/2019 | Sagar et al. | |
| 2019/0228628 A1* | 7/2019 | Droscher | G10L 15/26 |
| 2019/0281132 A1* | 9/2019 | Sethuraman | H04L 63/123 |
| 2019/0349447 A1* | 11/2019 | Adams | H04L 67/32 |
| 2020/0052982 A1* | 2/2020 | Nainar | H04L 43/028 |
| 2020/0137163 A1* | 4/2020 | Baghsorkhi | G06F 9/445 |
| 2020/0183744 A1* | 6/2020 | Kim | H04L 67/10 |
| 2020/0186445 A1* | 6/2020 | Govindaraju | H04L 41/5029 |
| 2020/0196210 A1* | 6/2020 | Kanitkar | H04W 36/12 |
| 2020/0220924 A1* | 7/2020 | Yang | H04L 67/1074 |
| 2020/0225982 A1* | 7/2020 | Jung | H04L 67/10 |
| 2020/0225983 A1* | 7/2020 | Jung | G06F 9/4881 |
| 2020/0250213 A1* | 8/2020 | Duchin | G06F 16/313 |
| 2020/0314168 A1* | 10/2020 | Nauerz | H04L 67/10 |
| 2020/0314169 A1* | 10/2020 | Camargo | H04L 67/10 |
| 2020/0336566 A1* | 10/2020 | Yassin | G06F 9/455 |
| 2020/0351381 A1* | 11/2020 | Lacey | G06F 9/45558 |
| 2021/0044547 A1* | 2/2021 | Bradley | H04L 51/02 |
| 2021/0058507 A1* | 2/2021 | Cornwell | H04M 3/2281 |
| 2021/0099520 A1* | 4/2021 | Anchi | G06F 13/102 |
| 2021/0194971 A1* | 6/2021 | Thum | H04M 3/5183 |

OTHER PUBLICATIONS

Machiraju Srikanth et al., "Conversations as Platforms" Developing BOTS with Microsoft BOTS Framework, APRESS, Berkeley, vol. 17, No. 5, Jan. 1, 2018, retrieved from www.link.springer.com 1, pages.

* cited by examiner

Create a new function

Choose your function name
Name is required                                              0 / 50

Give a short description of your function
                                                              0 / 100

Select your runtime
Node.js 8.11.1                                                ▼

Select a template to start your implementation
Messaging New Conversation

Event: Messaging New Conversation
```
 1  function lambda(input, callback) {
 2
 3      // Set conversation data.
 4      let conversation = input.payload;
 5
 6      // some processing ...
 7
 8      // Result can be either an object or array.
 9      // Hint: Make sure to only return each type once.
10      let result = [
11          {
12              type: "systemMessage", // Returns a system
13                  message into the convert
14              text: "your message"
15          },
16          {
17              type: "transfer", // Transfer the conversation
18                  to a new skill.
19              skillId: "123456"
20          },
21          {
22              type: "closeConversation" // Closes the
                    conversation.
          }
      ];
  }
```

[CANCEL] [CREATE FUNCTION]

FUNCTION-AS-A-SERVICE FOR TWO-WAY COMMUNICATION SYSTEMS

CROSS-REFERENCE TO RELATED APPLICATIONS

The present application claims the priority benefit of U.S. Provisional Patent Application No. 62/948,038, filed on Dec. 13, 2019, the disclosures of which is hereby incorporated by reference in its entirety for all purposes.

FIELD

The present disclosure relates generally to two-way communications, such as those involving a call center. More specifically, techniques are provided to deploy a serverless function-as-a-service (FaaS) platform integrated with a communication environment to provide serverless cloud-based functions to facilitate or improve a two-way communication session.

BACKGROUND

Companies tailor generic software-as-a-service (SaaS) platforms to their brand specific needs. SaaS platforms typically result in custom feature and enhancement requests, many of which are related to integration with the company's own backend systems. These feature requests are complex to implement and require a significant amount of time to procure domestically and internationally, making the entire process very expensive and slow, thereby failing to fulfill customer needs in a timely manner.

Moreover, past environments are not designed specifically for a contact center industry. Past environments are agnostic to a specific set of use cases or specific industries. The main goal of existing environments is to offer execution runtime for certain programming languages. For example, Amazon Lambda, allows deployment of a JavaScript Function by means of a unique uniform resource locator (URL). For example, by calling a URL, the Function received from the URL is executed and the Function developer gets charged for the execution time.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Examples described herein relate to "serverless" computing. Serverless computing is a cloud computing execution model in which a cloud provider runs a server, while a user of the cloud provider operates without a server managed by the user (e.g., the user is serverless by relying on servers of a cloud provider). Serverless computing allows dynamic management of machine resources from the cloud provider. Examples described herein provide improved serverless operations for two-way communication systems. Examples improve the operations of two-way communication systems and devices in such a system by combining event management and serverless code templates in a dynamically managed FaaS platform that can be accessed to improve real-time automation and machine assistance for agents in a two-way communication session. Additionally, unlike a SaaS platform that is explicitly based on calling a uniform resource locator (URL) over a wide area network (WAN) such as the Internet, examples described herein allow flexible invocation that can correspond to an event in a two-way communication session, improving the operation of devices and networks in a two-way communication system.

For example, devices in a communication system can use natural language processing (NLP) to identify events in a two-way communication, and can then call functions from a FaaS system to assist with the two-way communication. Different system implementations can use different intent groupings and categories of functions. For example, one function can be configured for addressing user questions related to medicine, and another function can be configured to provide user support for a hardware device. Such systems may additionally have further specialized functions. While a communication system for a medical system may have different associated functions for event triggers such as "schedule an appointment", "get test results", and "refill a prescription", a device support system can have functions for alternative categories such as "get operating instructions", "request warranty repairs", "speak with a technician", or "get troubleshooting assistance". Each of these events, when identified using a trigger template in a two-way communication session, can be used to call a serverless function from a cloud-based FaaS system. The use of such a serverless system allows the communication management system to dynamically allocate resources based on a system load that can vary dramatically over time. Additionally, by configuring serverless function templates in a FaaS system, updates to available functions can be made in the FaaS cloud by updating cloud-based templates while the two-way communication system operates, allowing updated functions to be accessed when ready via the cloud, rather than dealing with in-system updates.

Certain examples of the present disclosure include a computer-implemented method. The method may include accessing a template configured to execute a response based on an event, facilitating a two-way communication session with a user device, and processing data of the two-way communication session to identify an event trigger corresponding to the template. Execution of a serverless cloud-based function associated with the event trigger is requested, and one or more outputs of the serverless cloud-based function associated with the event trigger are integrated into the two-way communication session.

Additional examples include systems, devices, computer readable media, as well as other implementations described herein. The foregoing, together with other features and embodiments, will become more apparent upon referring to the following specification, claims, and accompanying drawings.

BRIEF DESCRIPTION OF THE DRAWINGS

The present disclosure is described in conjunction with the appended Figures:

FIG. 10 illustrates aspects of function template creation in accordance with some aspects of the present technology;

Figure 1A:
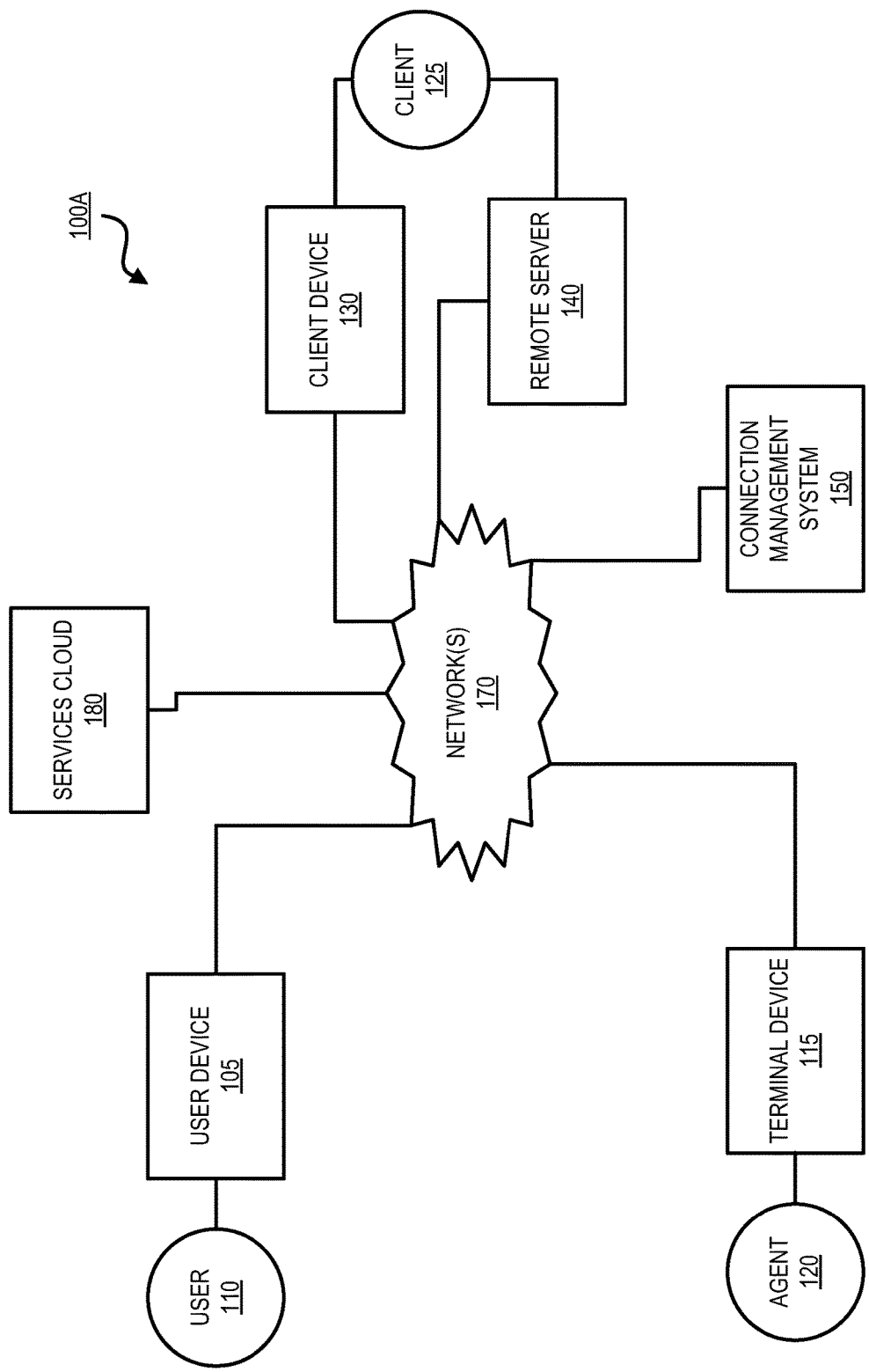
FIG. 1A shows an example embodiment of a communication system in accordance with some aspects of the present technology.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples and is not intended to limit the scope, applicability or configuration of the disclosure. Rather, the ensuing description of the examples will provide those skilled in the art with an enabling description for implementing examples. It is understood that various changes can be made in the function and arrangement of elements without departing from the spirit and scope as set forth in the appended claims.

Examples described herein relate to communication systems configured to provide information to users via a two-way communication system. Such a communication system can include a connection management system to pair users with agents, to enable the users to be provided information by the agents. In some examples, agents can be human agents, with artificial intelligence (AI) agents, machine analysis driven systems, or any combination of such agents. Such systems can, for example, use natural language processing (NLP), natural language analysis (NLA), neural networks, and various AI and machine learning tools to analyze and improve communications systems.

As described herein, such tools can be used to analyze aspects of a two-way communication for triggers that can be used to call functions from a cloud service. Such functions can be structured as part of a function-as-a-service (FaaS) system as described herein. As described above, by using a serverless cloud based provisioning system for functions, operation of a two-way communication system and devices within such a system can be improved. Improvements can include functional improvements with combined event management and serverless code templates in a dynamically managed FaaS platform that can be accessed to improve real-time automation and machine assistance for agents in a two-way communication session. The FaaS structures described can enable improved dynamic provisioning for a system, both in offering a variety of functions that can be updated and changed in real-time during FaaS system operation, and in allowing individual functions to be updated dynamically and in real-time during system operation using serverless cloud provisioning Additionally, unlike an SaaS platform that is explicitly based on calling a uniform resource locator (URL) over a wide area network (WAN) such as the Internet, examples described herein allow flexible invocation that can correspond to an event in a two-way communication session, improving the operation of devices and networks in a two-way communication system with flexible communication options. Various aspects can specifically be used in a communication system with a connection management system to manage increased numbers of connections between users and agents, increased numbers of machine or AI agents or machine-based assistance for human agents, and improved performance and information quality provided through two-way communications.

FIG. 1A shows a block diagram of an embodiment of a communication system 100A which implements and supports certain embodiments and features described herein. In particular, Certain embodiments relate to establishing connections between a user device 105 (which can be operated by a user 110), and a terminal device 115 (which can be operated by an agent 120) and/or a client device 130 (operated by a client 125). Connection management system 150 can both assist in matching user device 105 with terminal device 115, and in assisting access to functions called from services cloud 180.

In some embodiments, a user 110 can be an individual browsing a web site or accessing an online service provided by a remote server 140. In some embodiments, user 110 can be an individual looking to have a service performed on their behalf. Such a service can include having a question answered, operating another device, getting help from an agent with a task or service, conducting a transaction, etc.

A client 125 can be an entity that provides, operates, or runs the website or the online service, or individuals employed by or assigned by such an entity to perform the tasks available to a client 125 as described herein.

The agent 120 can be an individual, such as a support agent or sales associate tasked with providing support or information to the user 110 regarding the website or online service (e.g., information about products available at an online store). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a sales associate employed by the company. In various embodiments, the user 110, client 125, and agent 120 can be other individuals or entities.

While FIG. 1A shows only a single user device 105, terminal device 115, and client device 130, a communication system 100A can include multiple or many (e.g., tens, hundreds or thousands) of each of one or more of these types of devices. Similarly, while FIG. 1A shows only a single user 110, agent 120, and client 125, communication system 100A can include multiple or many of each of one or more of such entities. Thus, it may be necessary to determine which endpoint is to be selected to communicate with a given network device. Further complicating matters, a remote server 140 may also be configured to receive and respond to select communications with user device 105.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some embodiments, connection management system 150 routes the entire communication to another device. In some embodiments, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connections between user device 105 and one or more terminal devices 115. For example, upon receiving a communication from user device 105, connection management system 150 can estimate to which client (if any) the communication corresponds. Upon identifying a client, connection management system 150 can identify a terminal device 115 associated with the client for communication with user device 105. In some embodiments, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some embodiments, connection management system 150 can determine whether any connections are established between user device 105 and an endpoint associated with the client (or remote server 140) and, if so, whether such channels are to be used to exchange a series of communications including the communication.

Upon selecting an endpoint to communicate with user device 105, connection management system 150 can establish connections between the user device 105 and the endpoint. In some embodiments, connection management system 150 can transmit a message to the selected endpoint. The message may request an acceptance of a proposed assignment to communicate with a user device 105 or identify that such an assignment has been generated. The message can include information about user device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the user device 105, and/or an instruction to generate and transmit a communication to user device 105.

In some embodiments, communications between user device 105 and an endpoint such as a user device can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets. As will be described further herein, such configurations can facilitate management of conversations between user 110 and one or more endpoints.

In some embodiments, connection management system 150 can monitor the communication exchange in real-time and perform automated actions (e.g., rule-based actions, artificial intelligence originated actions, etc.) based on the live communications. For example, when connection management system 150 determines that a communication relates to a particular product, connection management system 150 can automatically transmit an additional message to the endpoint containing additional information about the product (e.g., quantity of products in stock, links to support documents related to the product, or other information about the product or similar products).

In some embodiments, a designated endpoint can communicate with user device 105 without relaying communications through connection management system 150. One or both devices 105, 115 may (or may not) report particular communication metrics or content to connection management system 150 to facilitate communication monitoring and/or data storage.

Connection management system 150 may route select communications to a remote server 140 in addition to use of services cloud 180 can be configured to provide information in a predetermined manner. For example, functions provided by services cloud 180 may access defined one or more text passages, voice recording and/or files to transmit in response to a communication in association with remote server 140. Such operations may select a particular text passage, recording or file based on, for example, an analysis of a received communication (e.g., a semantic or mapping analysis). Examples described herein may use combinations of FaaS systems in a services cloud in cooperation with a remote server 140 to facilitate or enhance two way communications (e.g., between a user device 105 and a terminal device 115)

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between services cloud 180 and connection management system 150, etc.) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some embodiments, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A user device 105, terminal device 115, and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal, IOT and client devices or may be part of one or more such devices (e.g., via installation of an application on a device). Remote server 140 may be separately housed from each device and connection management system 150 and/or may be part of another device or system. While each device, server and system in FIG. 1A is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

In different examples, a software agent or application operating on user device 105 or terminal device 115 can identify triggers that are used to call functions from services cloud 180 as part of FaaS system operation. In other examples, connection management system 150 can identify such triggers. In further embodiments, combinations of any such trigger identification can occur anywhere in a communication system 100A or 100B for different function calls. Particular details of such function calls are described in more detail below.

Figure 1B:
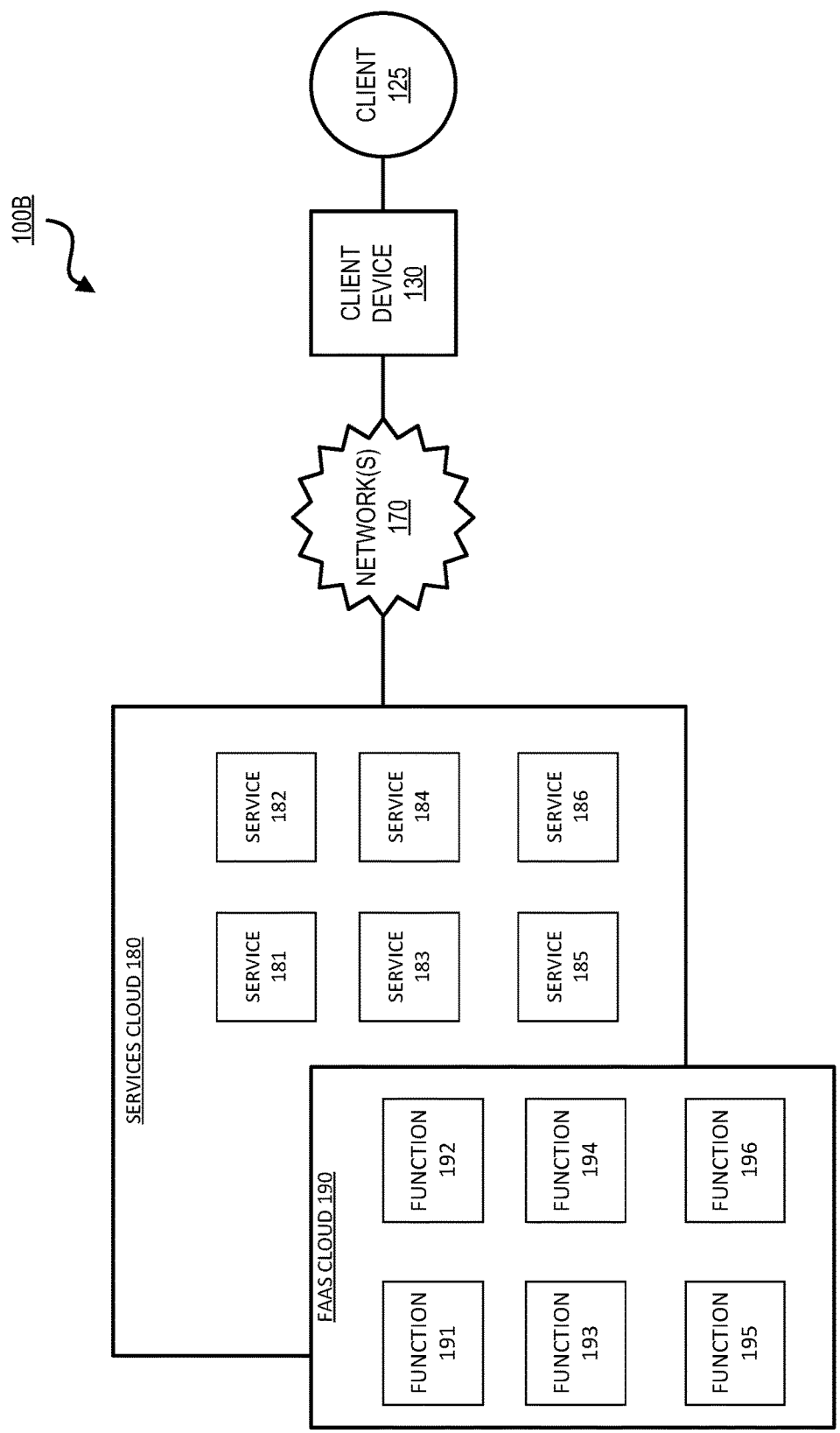
FIG. 1B shows an example embodiment of a communication system with a services cloud including function-as-a-service (FaaS) aspects in accordance with some aspects of the present technology.

FIG. 1B shows an example embodiment of a communication system 100B with a services cloud including function-as-a-service (FaaS) aspects in accordance with some aspects of the present technology. Communication system 100B illustrates alternate aspects of the communication system 100 shown as communication system 100A in FIG. 1A. FIG. 1B illustrates an example of a topology of a function-as-a-service (FaaS) cloud system as FaaS cloud 190 in services cloud 180, in accordance with some examples. As shown in FIG. 1B, in some situations, the FaaS cloud 190 system can utilize a combination of events and serverless code templates implemented as functions 191-196 for an improved conversational commerce setting.

The services cloud 180 system can be a serverless environment that can allow brands and companies tailor a conversational commerce platform to suit their specific business needs with services (e.g., service 181, 182, 183, 184, 185, 186) and, in accordance with examples described herein, functions (e.g., function 191, 192, 193, 194, 195, 196). The FaaS cloud 190 system within services cloud 180 as described herein can provide developers with the tools they need to innovate and rapidly enhance conversational experiences.

The FaaS cloud 190 platform can implement functions 191-196 (e.g., code-snippets or templates) on behalf of the customer represented by client 125 and client device 130. The functions 191-196 can be executed within a defined function without the need to for client 125 to set up a client server to host the functions. The FaaS cloud 190 platform also can deploy and execute custom code within a cloud-based system (e.g., services cloud 180) and be fully integrated into core-systems as part of a two-way communication system described herein. The FaaS cloud 190 system as part of a managed communication system described below can efficient device provisioning and updates, with reduced time and resources to update or deploy bot resources (e.g., combinations of specific conversational lifecycle events that can enhance conversational experiences in a two-way communication system) or other such functions in a communication system.

Figure 2:
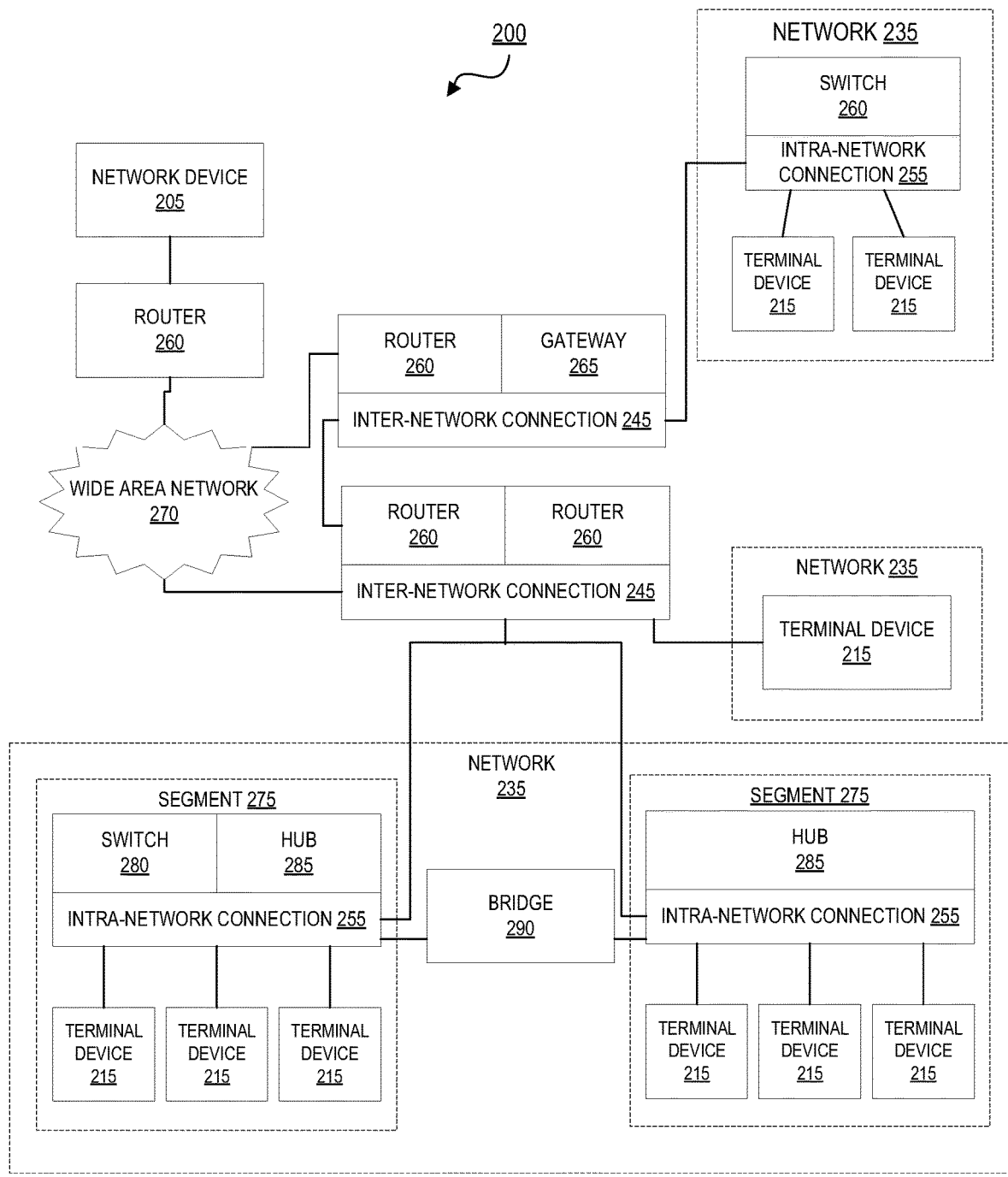
FIG. 2 shows an example embodiment of a communication system in accordance with some aspects of the present technology.

FIG. 2 shows a block diagram of another embodiment of a communication system 200. Generally, FIG. 2 illustrates a variety of components configured and arranged to enable a network device 205 to communicate with one or more terminal devices 215. The depicted instance includes nine terminal devices 215 included in three local-area networks 235.

In some embodiments, a communication from network device 205 includes destination data (e.g., a destination IP address) that at least partly or entirely indicates which terminal device is to receive the communication. Communication system 200 can include one or more inter-network connection components 245 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some embodiments, a local-area network 235 can be divided into multiple segments, each of which can be associated with independent firewalls, security rules and network protocols. An intra-network connection component 255 can be provided in each of one, more or all segments to facilitate intra-segment routing. A bridge 290 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some embodiments, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
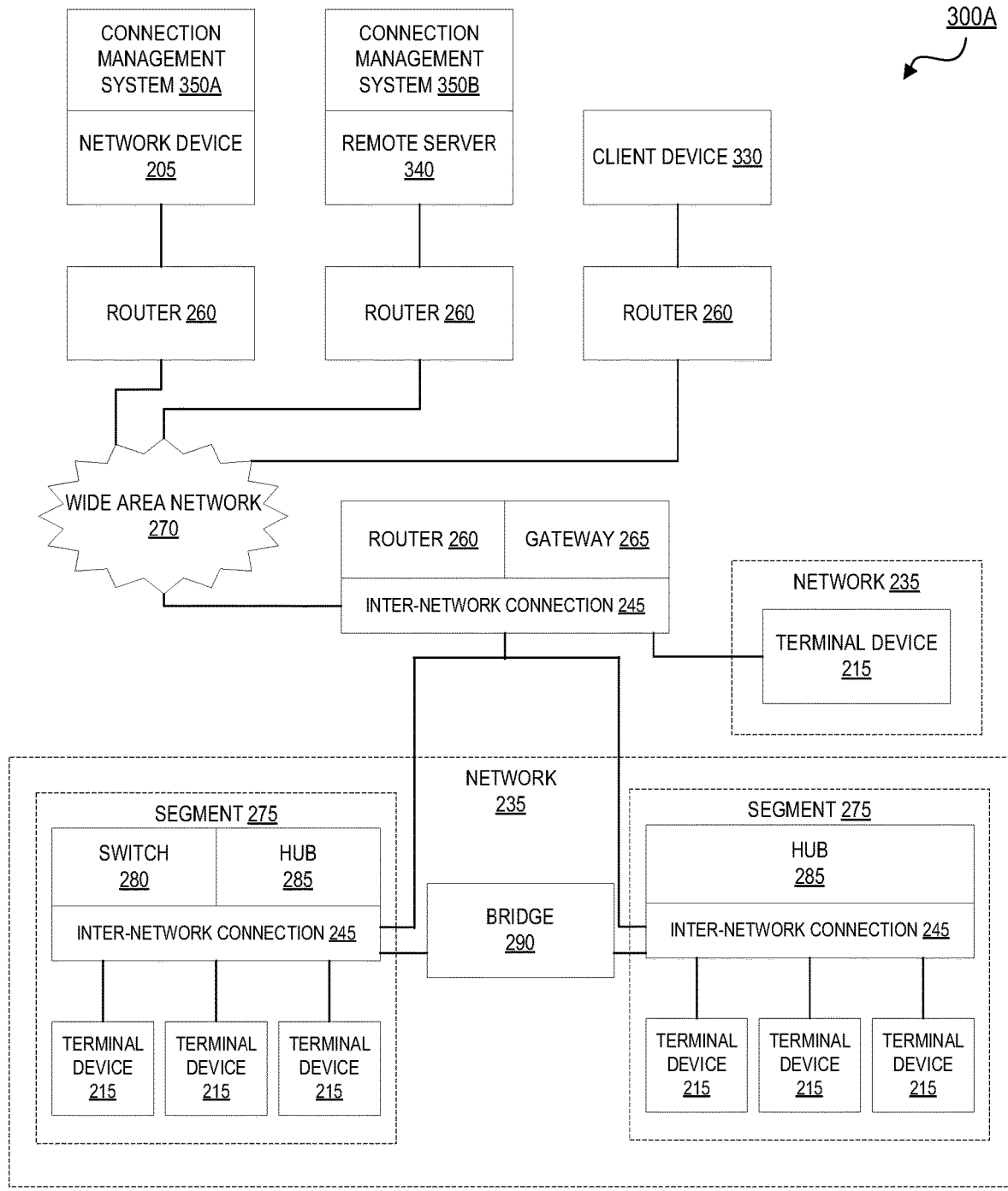
FIGS. 3A, 3B, and 3C show example embodiments of a communication system that includes a connection management system in accordance with some aspects of the present technology.
Figure 3B:
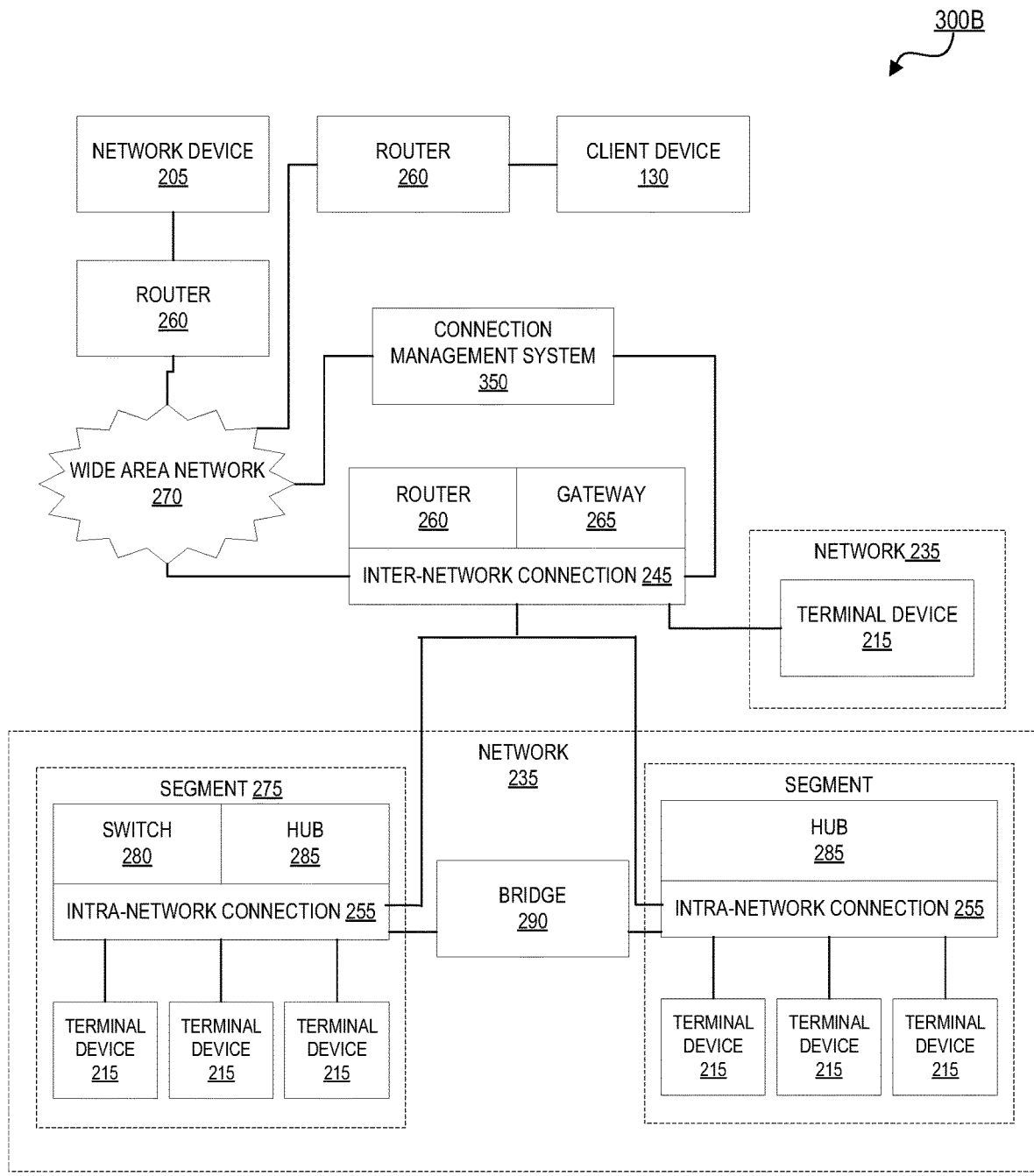
Figure 3C:
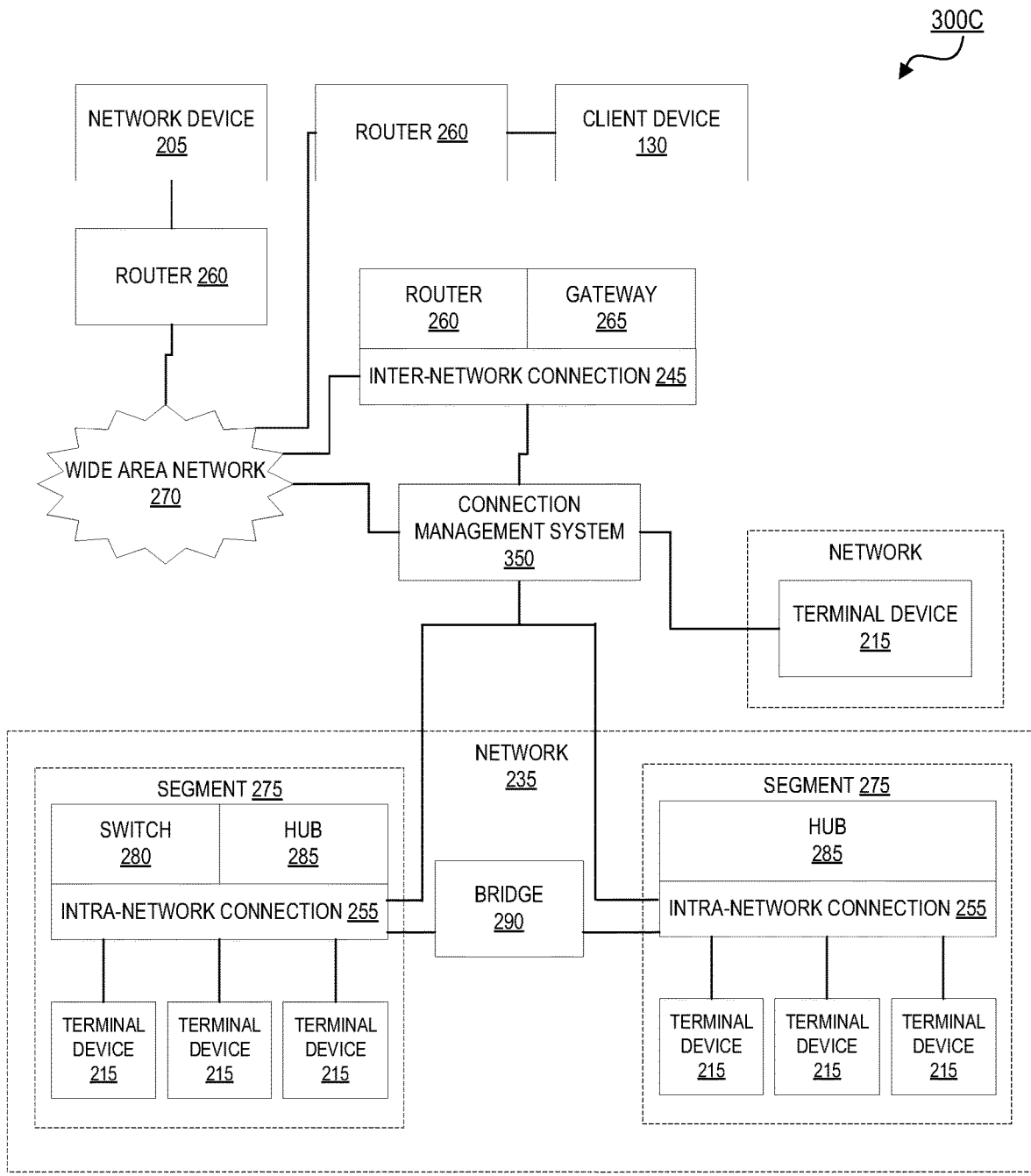

FIGS. 3A, 3B, 3C show block diagrams of other embodiments of a communication system 300a, 300b, 300c that includes a connection management system 350, including example connection management systems 350A and 350B. Each of the depicted systems 300a, 300b, 300c show only two local-area networks 235 for simplicity, though it can be appreciated that embodiments can be extended to expand the number of local-area networks. Each of systems 300a, 300b, 300c include a connection management system 150, which can identify which terminal device is to communicate with network device 205, can establish and manage (e.g., maintain or close) connections, can determine whether and when to re-route communications in an exchange, and so on. Thus, connection management system 150 can be configured to dynamically, and in real-time, evaluate communications, agent availability, capabilities of terminal devices or agents, and so on, to influence routing determinations.

In FIG. 3A, connection management system 150 is associated with each of network device 205 and a remote server 340 (e.g., connection management system 150a is associated with network device 205 and connection management system 150b is associated with remote server 340). For example, connection management system 150a and/or connection management system 150b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/ level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 150b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 150b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 150 can be configured to serve as a relay and/or destination address. Thus, for example, a set of network devices 205 may transmit communications, each identifying connection management system 150 as a destination. Connection management system 150 can receive each communication and can concurrently monitor a set of terminal devices (e.g., so as to generate metrics for each terminal device). Based on the monitoring and a rule, connection management system 150 can identify a terminal device 215 to which it may relay each communication. Depending on the embodiment, terminal device communications may similarly be directed to a consistent destination (e.g., of connection management system 150) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 150 is directly connected to intra-network components (e.g., terminal devices, intra-network connections, or other).

It will be appreciated that many variations of FIGS. 3A-3C are contemplated. For example, connection management system 150 may be associated with a connection component (e.g., inter-network connection component 245 or intra-network connection component 255) such that an application corresponding to connection management system 150 (or part thereof) is installed on the component. The application may, for example, perform independently or by communicating with one or more similar or complementary applications (e.g., executing on one or more other components, network devices or remotes servers).

Figure 4:
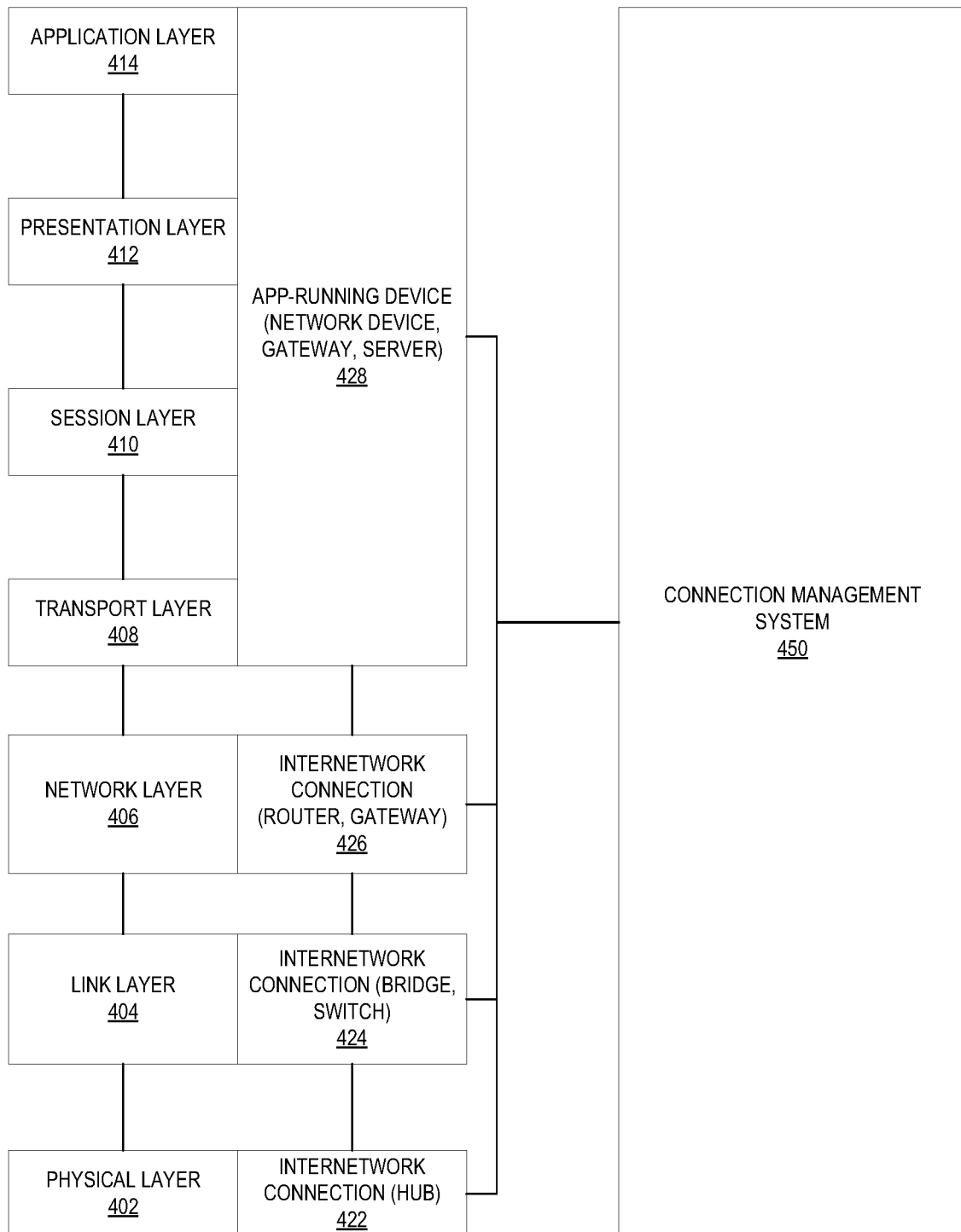
FIG. 4 shows a representation of a protocol-stack mapping of connection components' operation in accordance with some aspects of the present technology.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402, 404,406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402, 404, 406, 408, 410, 412414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406, 408, 410, 412, 414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5A:
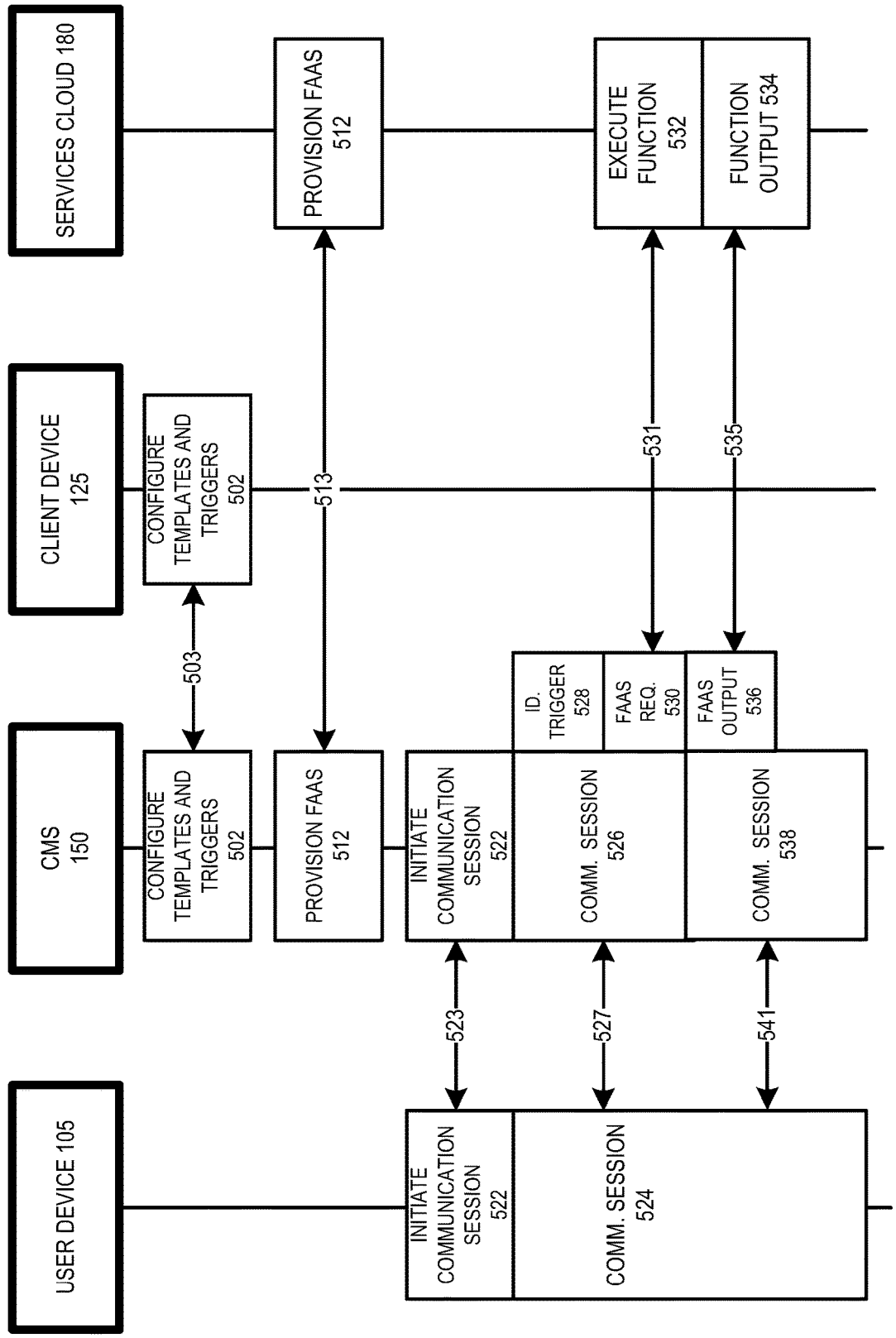
FIG. 5A illustrates aspects of a communication system in accordance with some aspects of the present technology.

FIG. 5A illustrates aspects of a communication system in accordance with some aspects of the present technology. FIG. 5A illustrates operations and communications between the user device 105, the connection management system 150, the client device 130, and the services cloud 180 (as well as FaaS cloud 190 within services cloud 180). FIG. 5A illustrates operations and communications for invoking and using functions via a FaaS cloud in accordance with examples described herein for a single client device, and with the listed individual elements. Additional examples can be used to provide similar functionality for any number of client and user devices, using any structure or combination of one or more connection management systems and service cloud structures.

The example of FIG. 5A shows connection management system 150 and client device 130 exchanging communications 503 for operations 502 to configure templates and triggers. Connection management system 150 then exchanges communications 513 as part of operations 512 to provision the FaaS system. Such operations and communications can include quality of service, available operations, structuring of templates and commands to access and update templates or functions in a system, or any other such operations described herein. After the FaaS provisioning operations 512 are complete, services cloud 180 is configured to accept FaaS invocation communications (e.g. FaaS request operation 528) and provide function outputs, or perform any other such triggered action as part of a FaaS system described herein. FIG. 5A describes client device 130 implementing FaaS functions in services cloud 180 via connection management system 150. In other examples, client device 130 can interact directly with interfaces of services cloud 180 or FaaS cloud 190 to allow a client business to update function operations or any aspect of a function that impacts the client's service through a communication system, either directly, or through any intermediate steps (e.g., via connection management system 150 or other such intermediate systems).

Following completion of provisioning of the FaaS setup with services cloud 180, user device 105 is involved in a two-way communication managed by connection management system 150. The two-way communication can be with an agent system (e.g., terminal device 115) or any other device managed by connection management system 150. The two-way communication begins with operations 522 to initiate the two-way communication, beginning with communication(s) 523. The two-way communication can be initiated by user device 105, for example, when a user selects a two-way communication interface in a sales website for a merchant (e.g., a merchant associated with client device 130). The two-way communication can also be initiated by connection management system 150, for example, by making an automated connection request using a sales lead associated with the merchant managing client device 130.

The two-way communication system then proceeds if the initiating party and the target party both agree to a two-way communication session, with operations 524 and 526 of the communication session and associated communications 527. At some point during communication session operations 526, operation 528 identifies a trigger in operation 528. The trigger can be identified at user device 105 or at connection management system 150. The trigger is a trigger that was configured and provisioned for in the services cloud 180 in operations 502 and 512. Once the trigger is identified, the associated function is invoked using FaaS request operations 530, which include communication of a request in communication 531. The FaaS cloud within services cloud 180 receives the request and executes the associated function in operations 532. As described herein, the executed function can either be sent with the request as part of communication 531, or can be previously structured with an identifier in services cloud 180, with communication 531 identifying the previously provided function.

Regardless of how the details of the function are provided, a function output is generated from the services cloud 180 in operations 534. The function output data from operations 534 is sent to connection management system 150 in communications 535, and managed as FaaS output data in operations 536. Such information can include details about a response associated with the trigger, automated tool data, or any other such information configured for a two-way communication and associated with a given trigger. The data received in operations 536 are integrated into the two-way communication session in operations 538 with communications 541, and used to facilitate aspects of the communication session. The facilitation can include providing information, providing machine interface tools, assisting with transferring one side of the two-way communication to a more appropriate counterparty (e.g., a different client or a different customized bot for a client), or any other such facilitation described herein to improve user experiences and interfaces with a communication system. The trigger and output data response can be repeated any number of times within a two-way communication. Additionally, a communication system can include many two-way communications between large numbers of user devices and terminals (e.g., between users and agents), with each session using triggers customized for different client (e.g., merchant service provider) systems with different sets of triggers.

Figure 5B:
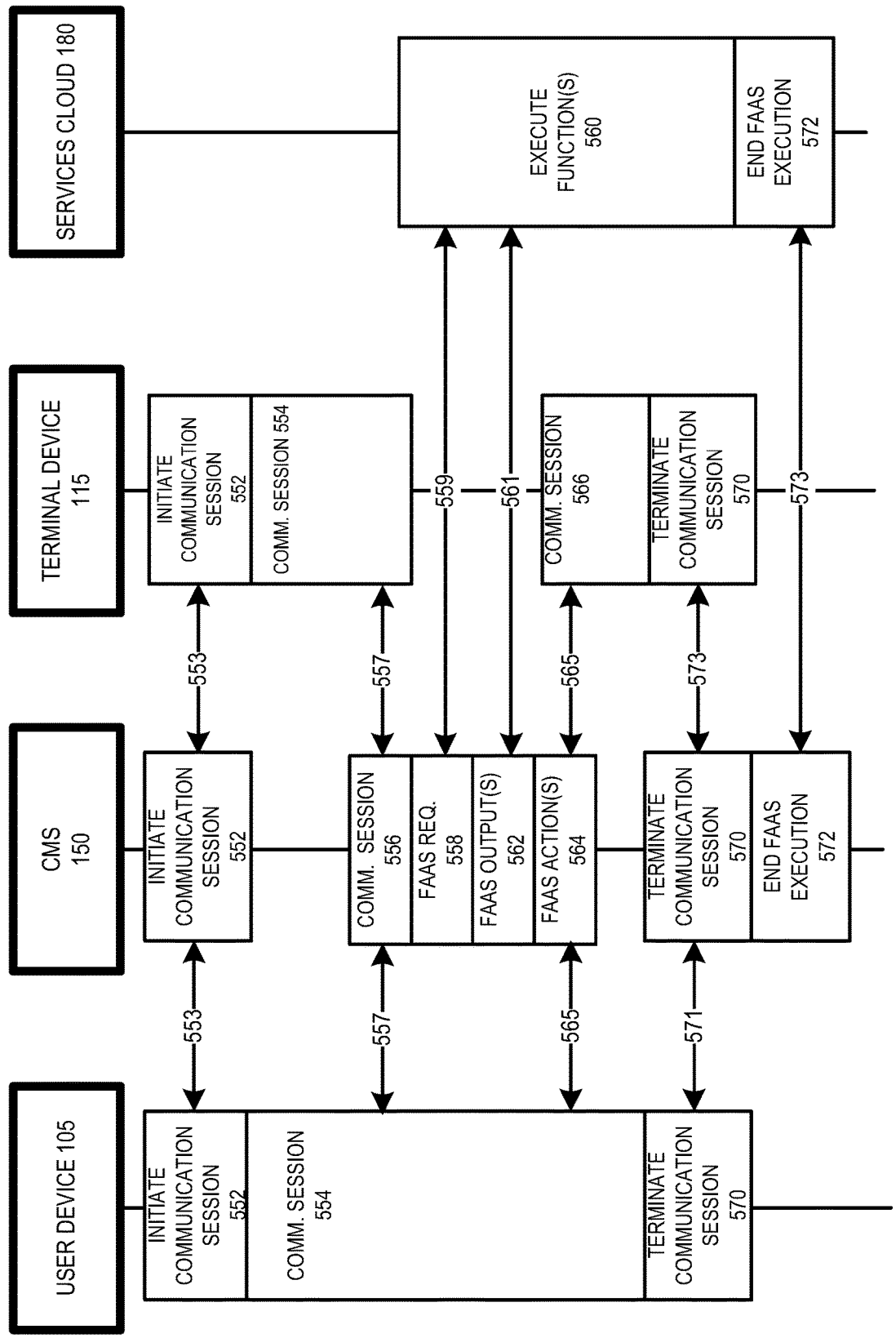
FIG. 5B illustrates aspects of a communication system in accordance with some aspects of the present technology.

FIG. 5B illustrates aspects of a communication system in accordance with some aspects of the present technology. FIG. 5B shows an additional example of operations for the same system as in FIG. 5A, where the FaaS services has previously been configured (e.g., by client device 130), and where terminal device 115 is shown as involved in an invocation and associated facilitation of a two-way communication with user device 105 using a two-way communication system that includes connection management system 150 and services cloud 180 (as well as FaaS cloud 190).

FIG. 5B shows a two-way communication between user device 105 and terminal device 115 managed by connection management system. The two-way communication session begins with operations 552 and communications 553 which establish the communication session between the user device 105 and terminal device 115. At the time of the session initiation, the two-way communication can also be associated with a custom set of triggers and functions associated with a particular client, as provisioned before the session begins. The particular set of triggers can be identified when the session is initiated through a client (e.g., merchant) website, or as part of a connection management system 150 initiated sales lead for a particular client and with the client's specialized set of triggers.

Figure 7:
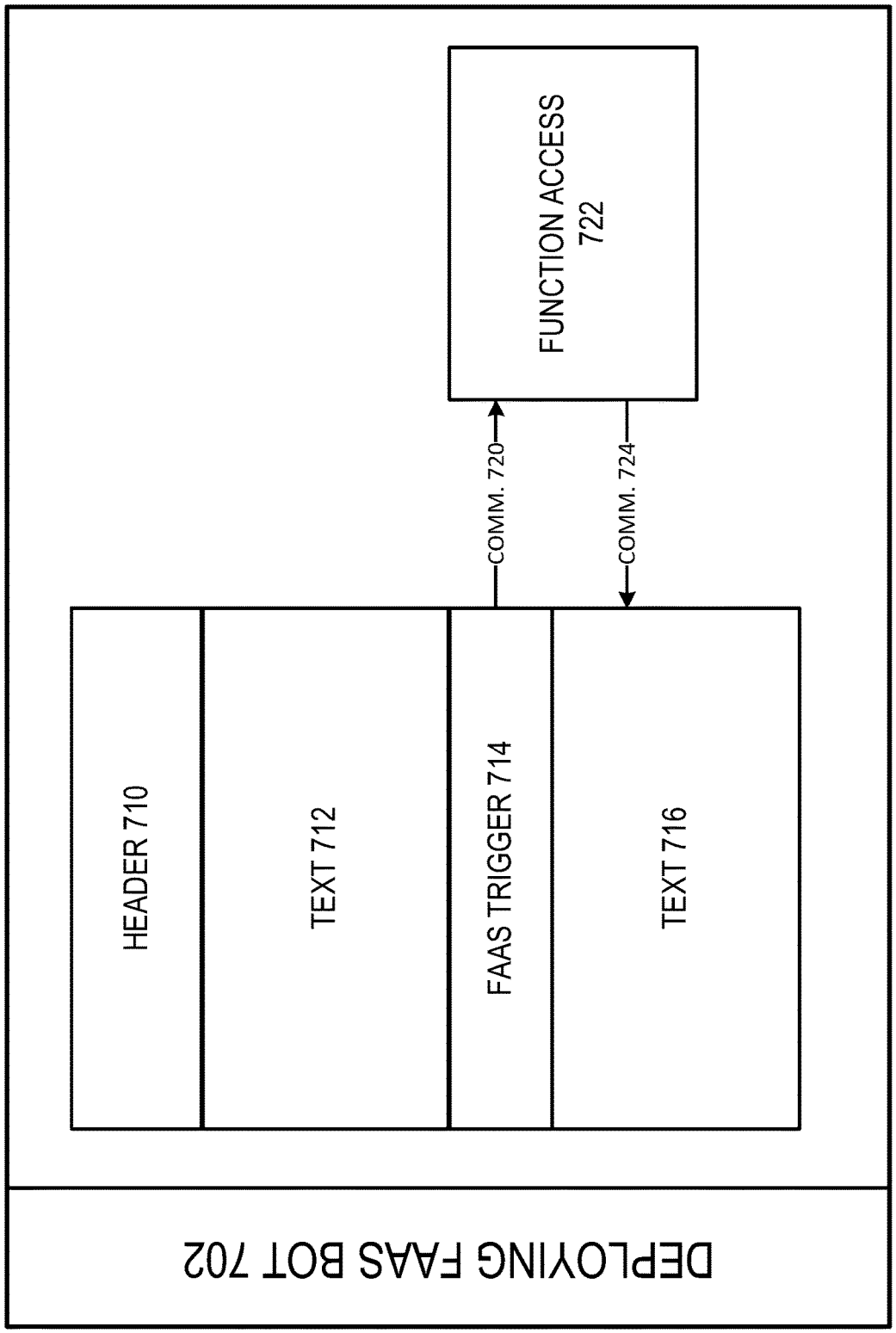
FIG. 7 illustrates aspects of a conversation deploying FaaS bot template in accordance with some aspects of the present technology.

Once the communication session is established and proceeds in operations 554 via communications 557, the connection management system 150 identifies details of the communication session in operation 556 that are associated with a trigger. As described herein, the triggers can be from text in the two-way communication session (e.g., as illustrated by FIG. 7 and the associated description below), or by other such operations of the system. For example, in some implementations, a connection initiation associated with a particular merchant can trigger one or more functions before any communications between the user device 105 and any terminal device 115 occurs. In the example of FIG. 5B, a function is invoked with a FaaS request operation 558 sent in communication 559. The services cloud 180 then begins executing a function in operation 560 that can proceed to be executed in real-time with the two-way communication session, with any number of additional sets of data and function outputs sent in communications 559 and 561. The connection management system 150 receives outputs in operations 562 and takes actions based on the outputs in operations 564, which can result in communications 565 which facilitate the communication session as part of operations 566 and/or 554. For example, a trigger in operation 556 can invoke a specialized assistance machine (e.g., bot) configured to perform natural language processing for a particular specialized topic, and to provide responses to user inputs customized for a particular topic or merchant category. The bot can be executed in real-time via services cloud 180, with cloud resources provisioned to the bot for the specific two-way communication, until the two-way communication session is terminated in operations 570 and communications 571 and 573. When the communication session is terminated, the connection management system 150 performs operations 572 to signal services cloud 180 in communication 573 to end execution of the function in operations 572. In the bot example above, the resources provisioned to provide the real-time specialized natural language processing for a customized topic will be terminated. The resources can then be returned to a pool of cloud resources to be available for other operations. Future communication using the same bot will invoke a new instance of the bot function in the services cloud 180, with resources provided for the new instance.

Figure 6:
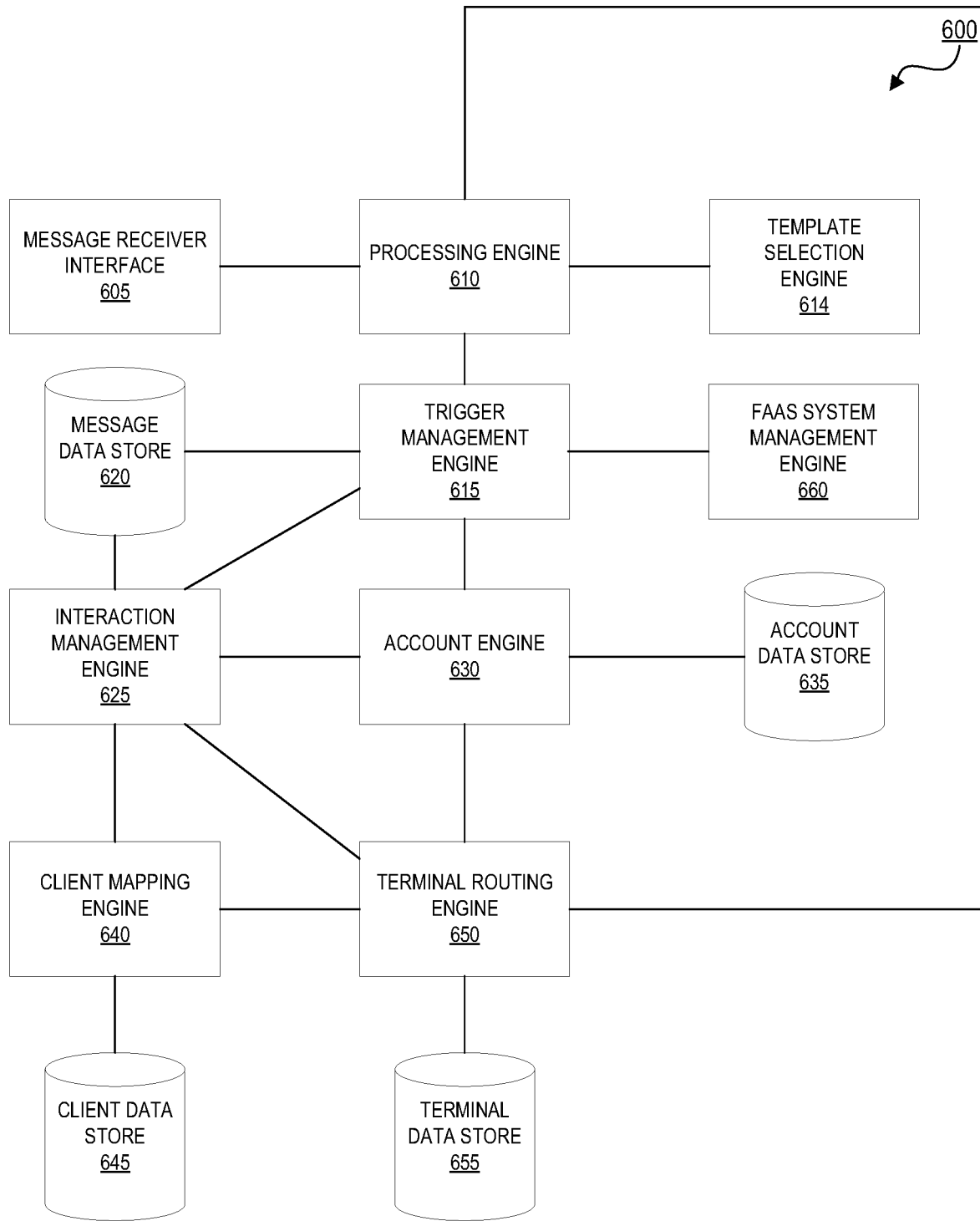
FIG. 6 shows an example embodiment of a connection management system in accordance with some aspects of the present technology.

FIG. 6 shows a block diagram of an embodiment of a connection management system 600. Connection management system 600 can, in some examples, be used as connection management system 150 or any other such connection management system. A message receiver interface 605 can receive a message. In some embodiments, the message can be received, for example, as part of a communication transmitted by a source device (e.g., housed separately from connection management system 150 or within a same housing), such as a network device or endpoint. In some embodiments, the communication can be part of a series of communications or a communicate exchange, which can include a series of messages or communication exchange being routed between two devices (e.g., a network device and endpoint). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some embodiments, the message can include a message generated based on inputs received at a user interface. For example, the message can include a message that was generated based on button or key presses or recorded speech signals, or speech to text software. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some embodiments, the message can be a natural language communication, whether spoken or typed. A natural language communication, as used herein, refers to ordinary use of a language used to communicate amongst humans, and is contrasted with use of language defined by a protocol required for communicating with a specific virtual assistant or artificial intelligence tool. A natural language communication should not require constraints such as the use of a wake word to alert an artificial intelligence tool that a communication is addressed to the artificial intelligence. Additionally, a natural language communication should not require the user to identify particular key words, specific phrases, or explicitly name a service in order to understand how to service the communication. In some embodiments, natural language may include emoticons and other forms of modern communication.

While the present technology utilizes natural language communications, the communications can identify particular key words, specific phrases, or explicitly name a service. For example, the message can include or be associated with an identifier of a client. For example, the message can explicitly identify the client (or a device associated with the client); the message can include or be associated with a webpage or app associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

Template selection engine 614 can be used by client devices or system operators to identify or modify trigger templates or function templates to be used in a communication system. The processing engine 610 can work with template selection engine to configure a system with templates selected using template selection engine 614. The processing can include pushing selected templates to connection management systems, terminal devices, or user devices for use when checking for function triggers as part of a two-way communication session. The process can also include pushing functions to any such device, or if a function is stored in a cloud system, the functions are pushed to the cloud and identifiers are pushed to the triggering devices (e.g., to allow a triggering device such as a terminal device to identify a function to be used when an invocation communication is sent to an FaaS cloud).

A trigger management engine 615 may assess the (e.g., extracted or received) message. This message can be accessed from a message data store 620, which manages messages received by interface 605 and assessed by trigger management engine 615. The assessment can include identifying, for example, one or more triggers for the message. Examples of triggers can include (for example) text indicating a particular topic, sentiment, complexity, and urgency. A topic can include, but it not limited to, a subject, a product, a service, a technical issue, a use question, a complaint, a refund request or a purchase request, etc. In some examples, a trigger can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency). Aspects of trigger management engine 615 can use machine learning to generate and revise systems for associating incoming communications (e.g. text) from a user with an intent category. For example, machine learning models can use previous data and results of associations between words and phrases in incoming communications as well as natural language data from current and historical communications to generate and update associations between words and intent categories. The learning can be done with any combination of supervised learning with constructed data sets and historical data, unsupervised learning based on expectation or projection models for current routing paths in a system and system use targets. Any such data can be used in operations for natural language processing (e.g. natural language understanding, natural language inference, etc.) to generate natural language data or to update machine learning models. Such data can then be used by the client systems or shared with applications running on a network device or on a server to improve dynamic message processing (e.g. improved intent indicator data results or response message generation). In some examples, convolutional neural networks can be used with sets of incoming words and phrases along with output intent categories. Such a neural network can be trained with input words and phrases and output correlations to intent categories. Realtime system operations can then use instances of such a neural network to generate data on associations between incoming user communications and words in a user communication and intent categories in a system. Based on the outputs of such a neural network, an intent category can be assigned to a user or user account involved in a communication, and associated actions can be assigned. In some implementations, the neural network settings can be modified with real-time dynamic feedback from usage to shift associations between words in user communications and intent categories and actions selected based on these words. These selections can be probabilistic, and so the AI and machine learning systems can automatically track shifts in user expectations by integrating user feedback and usage data to improve system performance. For example, when a user is directed to an endpoint action for a particular intent category or subcategory, the user can provide a feedback communication indicating that the user is looking for a different action. This can be used as real-time feedback in a system to shift the probabilities and annotations associated with future intent category assignments.

In some embodiments, a trigger can invoke a function used to clarify a user intent by engaging user 110 in a conversation that can include clarifying questions, or simply requesting additional information. Such a function can have associated additional triggers specifically for the invoked function and specialized based on associated details to match a function with an intent of a two-way communication. Such examples, can thus include conditional triggers, such that an invoked function can be associated with conditional triggers that are only active as part of a function operation, and when the function terminates (e.g., by routing a two-way communication), the associated triggers are no longer active. Just as above, various machine learning and AI systems can be used to generate and update systems for responding to a user. For example, in some systems, each intent category and sub-category can have a different associated convolutional neural network. In some examples, an action taken in response to processing words from a user is to associate an intent category and a neural network for the intent category to a communication with a user, and to process the user communications using the assigned neural network. As described herein, multiple different neural networks can be used in the course of a conversation (e.g. multiple back and forth communications between a user and a system), and data for such communications can be used in machine learning operations to update the neural networks or other systems used for future interactions with users and operations to associate intent categories and actions with words from a user communication. Usage data by users can be used to adjust weights in a neural network to improve intent category assignments and track changes in user intent trends (e.g. final user intent results identified at the end of a user conversation with a system as compared with assigned intents based on initial user communications). Data generated by intent management engine 615 can be stored with associated message data in message data store 620, and this data can be used for various updates, including managing data for continuous real-time analysis updates or other dynamic feedback and modifications to a system, as described herein.

An interaction management engine 625 can determine to which endpoint a communication is to be routed and how the receiving and transmitting devices are to communicate. Each of these determinations can depend, for example, on whether a particular network device (or any network device associated with a particular user) has previously communicated with an endpoint in a set of endpoints (e.g., any endpoint associated with connection management system 150 or any endpoint associated with one or more particular clients). In some examples, an interaction management engine 625 is invoked as an action to route a user communication to a different endpoint based on intent, trigger, or function categories assigned to a user communication and used to associated particular triggers with a sub-portion of a two-way communication session (e.g., where some triggers apply to parts of a session but not other parts). Such examples can involve updates to an endpoint (e.g. a particular agent or AI bot resource) being used during a conversation with a user, with triggers only associated with a session until an endpoint is achieved.

In some embodiments, when a network device (or other network device associated with a same user or account) has previously communicated with a given endpoint (e.g., communications with a particular agent or AI system about matters relating to a particular topic or system client or business), communication routing can be generally biased towards the same endpoint. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more endpoints); whether the endpoint is available; and/or a predicted response latency of the endpoint. Such factors may be considered absolutely or relative to similar metrics corresponding to other endpoints. A re-routing rule (e.g., a client-specific or general rule) can indicate how such factors are to be assessed and weighted to determine whether to forego agent consistency. Just as above for intent category assignment, AI analysis can be used to determine re-routing rules in a system. For example, when history data processed by machine learning systems identify no correlation between certain types of user communications and certain re-routing operations, such re-routing operations can be discontinued. By contrast, when such machine learning analysis identifies positive results correlated with re-routing rules, such rules can be emphasized or strengthen, to prioritize re-routing (e.g. dedicating additional systems to re-routing, prioritizing re-routing options in agent assignments, etc.) In some examples, a trigger can be flagged or identified as associated with successful endpoint routing by machine learning systems as described above.

With regard to determining how devices are to communicate, interaction management engine 625 can (for example) determine whether an endpoint is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more endpoints. Appreciably, some communication types will result in real-time communication (e.g., where fast message response is expected), while others can result in asynchronous communication (e.g., where delays (e.g., of several minutes or hours) between messages are acceptable).

In some embodiments, the communication type can be a text messaging or chat application. These communication technologies provide the benefit that no new software needs to be downloaded and executed on users' network devices. In some examples, the communication type can be a voice communication type. In such examples, voice to text systems can be used to process voice communications into words to be analyzed by example systems described herein. In some examples, words analyzed by a system can include words represented by audio data. Thus, as described herein, words can be represented by combinations of symbols stored in memory (e.g. American Standard Code for Information Interchange (ASCII) data) or can be represented by audio data (e.g. data representing sound combinations)

Interaction management engine 625 can interact with an account engine 630 in various contexts. For example, account engine 630 may look up an identifier of a network device or endpoint in an account data store 635 to identify an account corresponding to the device. Further, account engine 630 can maintain data about previous communication exchanges (e.g., times, involved other device(s), channel type, resolution stage, topic(s) and/or associated client identifier), communication channels (e.g., indicating—for each of one or more clients—whether any channels exist, an endpoint associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, an endpoint, an account and a client. Account engine 630 can subsequently notify a user of the channel's existence such that the user can be aware of the agent consistency being availed.

Interaction management engine 625 can further interact with a client mapping engine 640, which can map a communication to one or more clients (and/or associated brands). In some embodiments, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some embodiments, a message may not particularly correspond to any client. For example, a message may include a general query. Client mapping engine 640 may, for example, perform a semantic analysis on the message, identify one or more keywords and identify one or more clients associated with the keyword(s). In some embodiments, a single client is identified. In some embodiments, multiple clients are identified. An identification of each client may then be presented via a network device such that a user can select a client to communicate with (e.g., via an associated endpoint).

Client data store 645 can include identifications of one or more endpoints (and/or agents) associated with the client. A terminal routing engine 650 can retrieve or collect data pertaining to each of one, more or all such endpoints (and/or agents) so as to influence routing determinations. For example, terminal routing engine 650 may maintain an endpoint data store 655, which can store information such as endpoints' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether an endpoint is available may be dynamically updated based on (for example) a communication from an endpoint (e.g., identifying whether the device is asleep, being turned off/on, idle/active, or identifying whether input has been received within a time period); a communication routing (e.g., indicative of whether an endpoint is involved in or being assigned to be part of a communication exchange); or a communication from a network device or endpoint indicating that a communication exchange has ended or begun.

It will be appreciated that, in various contexts, being engaged in one or more communication exchanges does not necessarily indicate that an endpoint is not available to engage in another communication exchange. Various factors, such as communication types (e.g., text, message, email, chat, phone), client-identified or user-identified target response times, and/or system loads (e.g., generally or with respect to a user) may influence how many exchanges an endpoint may be involved in.

When interaction management engine 625 has identified an endpoint to involve in a communication exchange or connection, it can notify terminal routing engine 650, which may retrieve any pertinent data about the endpoint from endpoint data store 655, such as a destination (e.g., IP) address, device type, protocol, etc. Processing engine 610 can then modify the message-inclusive communication or generate a new communication (including the message) so as to have a particular format, comply with a particular protocol, and so on. In some embodiments, a new or modified message may include additional data, such as account data corresponding to a network device, a message chronicle, and/or client data.

A message transmitter interface 660 can then transmit the communication to the endpoint. The transmission may include, for example, a wired or wireless transmission to a device housed in a separate housing. The endpoint can include an endpoint in a same or different network (e.g., local-area network) as connection management system 150. Accordingly, transmitting the communication to the endpoint can include transmitting the communication to an inter- or intra-network connection component.

FIG. 7 illustrates aspects of a conversation deploying FaaS bot 702 template in accordance with some aspects of the present technology. The FaaS system can invoke FaaS functions from standard messaging events. For example, a new conversation start event can be chosen as a trigger to invoke a function. FIG. 7 shows a communication including header 710, text 712, FaaS trigger 714, and text 716. The FaaS trigger 714 can be a specific set of text as part of the communication that is matched to a trigger template. When a communication is received, a set of trigger templates is compared with the text to identify FaaS trigger 714. As described above, the set of trigger templates can include triggers for all clients of the system, or can be customized by a client. In some examples, client devices can access a system to update the set of templates or to modify or alter individual templates dynamically in real-time as the system is operating. As the updates are occurring, existing function executions in a services cloud (e.g., operations 560 in cloud 180) can continue running an old function, while new invocations in the services cloud will use the updated function once the updates are complete. If a function trigger invokes a communication that is sent to the services cloud (e.g., with code to execute the function), the update to the user device or terminal device that invokes the function will similarly allow such dynamic real-time updates to a system at the user devices and terminal devices.

The example of FIG. 7 describes identifying a trigger from message text, but any other such trigger can be used, including details of header 710, or any other such identifiable element of a communication in a system as described herein.

When FaaS trigger 714 is identified as described above, the device that identifies FaaS trigger 714 invokes the corresponding function by initiating communication 720 for function access 722. Along with the invocation, the function can be sent to the FaaS system in communication 720 with a payload including metadata related to the new conversation. In other examples, the function or a function template can be pre-configured in the FaaS system (e.g., FaaS cloud 190), and simply identified by the invocation communication initiated by the trigger. In any such example, the payload can then be used in the function as executed by the FaaS system (e.g., FaaS cloud 190) in function execution as well as in any further processing and referencing. The FaaS system may support various programming languages such as JavaScript, Python, Structured Query Language, PHP, Ruby, C, C++, C Sharp, Visual Basic, Java, Objective-C, Perl, or any other programming language suitable for the intended purpose and understood by a person of ordinary skill in the art. Results or outputs of the function are returned in communication 724, and can be used to facilitate or influence text 716, to generate new text or data to be communicated as part of a two-way communication session, or to take any other action to facilitate improved operation of the communication system.

The FaaS system can execute custom functions with custom logic in response to events in the FaaS platform. Events occur all the time and can include events such as "Conversation Started," "Conversation Survey Submitted," "An agent logging in/out of a platform," and any other event that can induce a trigger suitable for the intended purpose and understood by a person of ordinary skill in the art. These events can be configurable to be customized that define custom logic. Developers can further prepare and write simple and complicated functions to further development the conversational experience. With the click of a button, a cloud-based platform can be deployed such as LivePerson Cloud or other cloud services. The FaaS system also can support server provisioning, security, deployment, and scaling to support developers and companies in the implementation of the code templates for a better conversional experience.

The FaaS system can include various elements in the implementation of the components that make up the system. For example, an "event gateway" can allow platform events to serve as triggers to invoke functions when something interesting occurs in a messaging conversation (e.g., the conversation becomes idle, participants join/leave, etc.). The event gateway can allow external developers to connect and extend the FaaS platform more easily with additional code.

The FaaS environment can enable users and developers the ability to combine event triggers and coding templates in a contact center context while being in a conversational commerce environment. The FaaS platform can offer event types that are geared towards a contact center industry. For example, the "Messaging Line in Off-Hours" can be triggered when a consumer writes a message in a conversation that started during working hours, but in the meantime the contact center has switched to off-hours. On the FaaS platform, a JavaScript function can be triggered in response to the above-referenced event. Other serverless providers fail to provide this kind of response to similar events. The FaaS platform can provide various templates to respond to any given number of events that are specific to the contact center industry.

The FaaS system and method described herein does not only provide contact center specific events for its serverless environment, the FaaS system also can provide working code templates for events with any industry suitable for the intended purpose and understood by a person of ordinary skill in the art. If a function developer selects the "Messaging Line in Off-Hours" event, the FaaS platform can provide a ready-to-go code template that is configurable upon receipt. Such an example enables the function developer to leverage existing infrastructure, improving the operation of an associated computing device by reducing the time taken to generate a template. Improved device functionality is also created such that the function developers also can customize the template to meet their needs and provide additional responses to an event.

One example of a trigger event with two possible (mutually exclusive) pieces of associated metadata are a trigger 1. Messaging Conversation End with metadata A. Agent closed the conversation or B. Consumer closed the conversation. Another example of a trigger event with two (not mutually exclusive) pieces of associated metadata are trigger 2. Messaging Conversation Idle with metadata options A. Agent unresponsive and/or B. Consumer unresponsive. As described above, the trigger can be identified as part of a two-way conversation or by system event in a connection management system or any other portion of a system, and used to invoke a function at a FaaS system. The communication to the FaaS system can either identify a function previously configured in the FaaS system, or can include a function to be executed by serverless resources of a services cloud configured for FaaS operations. The communication can additionally include the metadata (e.g., indicating a conversation end event was triggered by a consumer closing a two-way communication) which can be used by the FaaS system. In other examples, the additional information above is part of a template to identify separate but related triggers, such that 1. A. above would be a different trigger with a different associated function for an agent closing a conversation than the trigger for 1. B. when the consumer closes a conversation. In such an example, the function identified by or included in the invocation communication would be different for the different triggers. The separate trigger (e.g., two-trigger) example is in contrast to the prior example, where a single trigger (e.g., message conversation ends) has different metadata options. An additional non-exhaustive list of trigger examples includes triggers: 3. Messaging Conversation Routing; 4. Messaging Line in Off-Hours; 5. Messaging New Conversation; 6. Messaging Participants Change; 7. Messaging Time-to-Respond (TTR); and 8. Chat Post Survey Email Transcript (CSAT Rules).

Each of the above triggers, or any other such triggers, can have any number of associated pieces of metadata identifying associated information or associated functions to be used in response to the trigger. Further examples can include different variations on such triggers. For example, trigger 6 (e.g., participants change) can identify different categories of participants, with different triggers based on the combinations of new and old participants and the associated participant categories.

In some examples, a system can be configured with messaging-events for Function Invocation (e.g., triggers based on a messaging event without associated two-way communication data, or other such messaging events). In some such examples, the FaaS platform can override certain messaging-events. The following "Conversation State Change Events" are examples that can be used to trigger functions to execute:
9. New Conversation
  A. This event can be executed if a consumer creates a new conversation;
10. TTR changed
  A. The consumer can trigger an event by marking the conversation as urgent or vice versa;
  B. The agent can trigger the event by changing the TTR;
11. Participants Change
  A. This event can be executed if someone joins or leaves the conversation;
12. Conversation Idle
  A. This event can be executed if a consumer or agent is not answering in the configured idle-timeout;
13. Conversation Routing
  A. This event can be executed if the conversation is routed to a different skill;
14. Messaging Line in Off-Hours
  A. This event can be executed if a conversation was opened in office-hours and a new consumer line in conversation is written in off-hours (e.g., off-hour message);
15. Conversation End
  A. This event can be executed after a conversation is closed By overriding these events, the deployed function can be called and processed by the function. If no system message is set in the result of the function, a default automatic message can be triggered.

The FaaS platform can have the option to execute callback commands to an invoker. For conversational event invocation, the service that invokes the functions can be a controller bot. This service also can be responsible for sending system messages into the conversation. With the controller bot as the invoker, the FaaS platform can execute the following callback commands with the controller bot:
16. Send a System-Message
17. Transfer Conversation to a different Skill
18. Close the Conversation The FaaS platform also can have the option to not perform a callback command. This can be relevant if a user or developer desires only to use the invocation capability of the controller bot in order to trigger functions.

The FaaS platform can further add multiple commands to the response. The result can be an array or a single object. If more than one command per type (e.g., 2 System-Messages) is added, only the first command of this type may be processed.

An example of the callback can include:

```
let result =
[{type: "systemMessage", // Returns a system message into the
conversation text: "your message"},
{type: "transfer" // Transfers the conversation to a new skill skillId:
"123456"},{type: "closeConversation" // Closes the conversation}]
callback(null, result)
```

As described above, FaaS-Messaging, such as communications of FIGS. 5A and 5B with services cloud (and associated FaaS cloud 190) can include a payload. For example, a Payload can be included in each Messaging "XXX" template function. With the FaaS platform (e.g., FaaS cloud 190), users can implement custom feature requests faster and roll out the templates at an expedited timetable, thereby increasing productivity. In addition, the FaaS platform can empower brand developers to use FaaS to implement their own feature requests. This is attractive for small and medium sized customers/brands that do not have dedicated professional services.

The FaaS platform can enable companies to have their own engineers on the platform and develop custom features, which can be triggered in response to certain events in the FaaS platform. Extensions can further be written by third party companies and deployed with the click of a button into the LivePerson Cloud.

Figure 8:
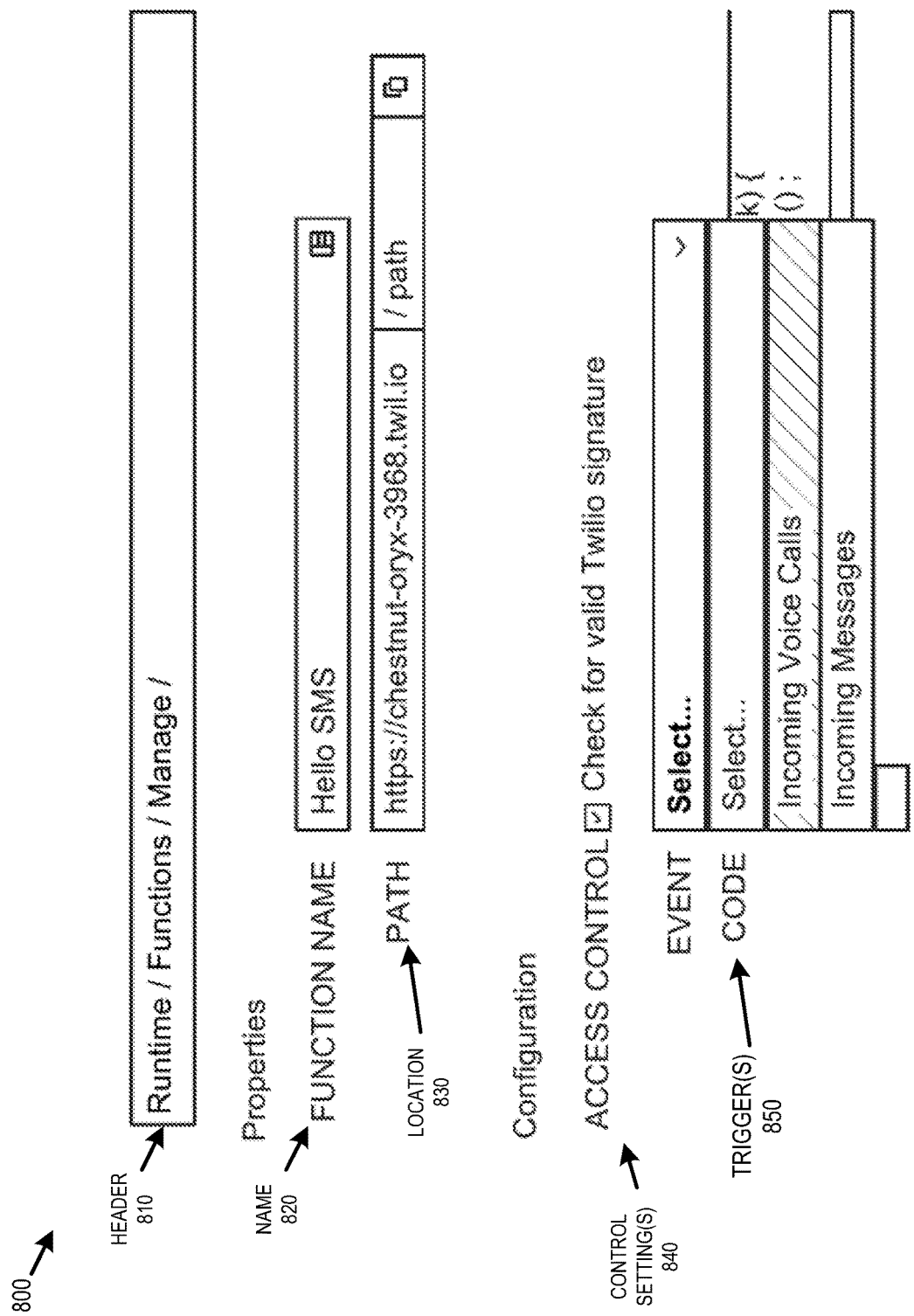
FIG. 8 illustrates an example of properties and configurations of functions for use in a FaaS system in accordance with some aspects of the present technology.

FIG. 8 illustrates an example of properties and configurations of the functions, in accordance with some examples. FIG. 8 illustrates a function template 800. The FaaS platform (e.g., FaaS cloud 190 in service cloud 180) can offer a distinct set of function templates and higher level event types that can be less geared towards a conversation lifecycle. Function template 800 is one example of a function template that can be used as part of a set of function templates. Other examples of function templates can include other structures. The example function template 800 of FIG. 8 includes a header 810, a function name 820, a location 830, control settings 840, and triggers 850.

Header 810 can be used to organize function templates. For example, the illustrated Runtime/Functions/Manage of header 810 can be a nested structure for organizing sets of function templates, with function template 800 one of many function templates in a set. In other examples, other such organizing structures can be used.

Name 820 can be used to identify a specific function template. In the example of FIG. 8, "Hello SMS" is an identifying name for function template 800. Similarly, location 830 can be identifying path information for data or code for implementing the function associated with function template. For example, the illustrated secure hypertext transfer protocol (HTTPS) of location 830 can be associated with storage space used for the instructions of function template 800. In some examples, where the code is stored in a FaaS cloud, the location 830 can be a location within the FaaS cloud. In other examples, the location 830 can be any other storage location that can be accessed and used to send the code for the function to the FaaS cloud. Control settings 840 and triggers 850 are configuration settings for use of the function template 800 in a communication system. Control settings 840 can be used to manage security or operational controls for use of function template 800. Trigger(s) 850 can identify any triggers to be used when function template 800 is implemented as part of a communication system. For example, function template 800 can have multiple triggers, including a trigger for an incoming voice call and a separate trigger for an incoming text message. As described above, when function template 800 is used in a system (e.g., in a user device 105, CMS 150, or client device 130), or actions and communications can be processed and compared with triggers. When a trigger is matched to an action or communication, the function is invoked in a FaaS cloud (e.g., using location 830), either by invoking code in the FaaS cloud, or by accessing and sending the code for the function to the FaaS cloud to be executed at the FaaS cloud.

Figure 9:
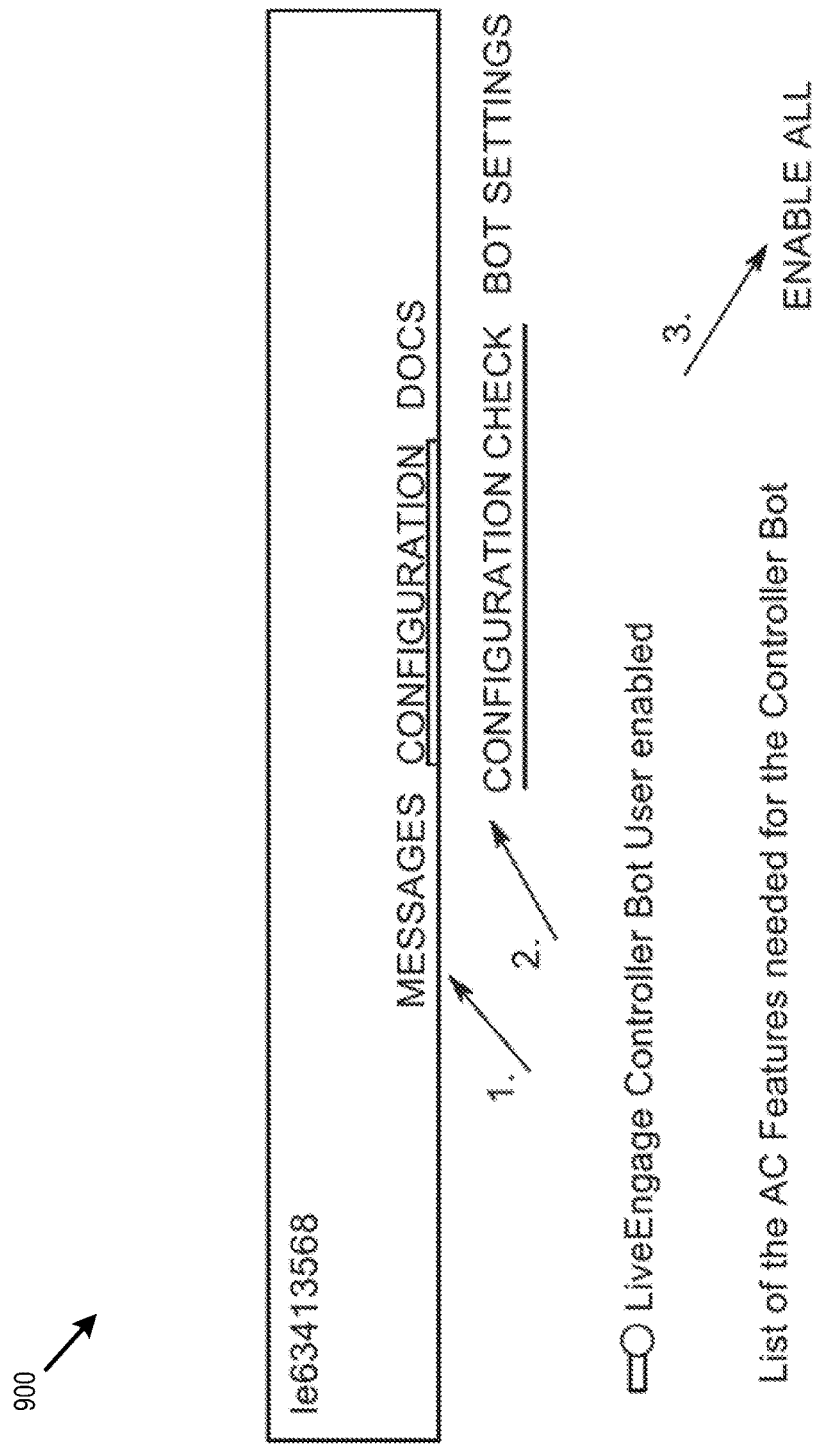
FIG. 9 illustrates an example of a controller bot in accordance with some aspects of the present technology.

FIG. 9 illustrates an example of a controller bot 900, in accordance with some examples. As detailed above, in some examples, function templates such as function template 800 can be used in a FaaS system to allow both real-time addition and modification of functions to the system, as well as allowing addition and modification of functions by both internal system sources and independent third party sources. For example, in some implementations, a client (e.g., a merchant system) can add functions to a system for communications associated with the client during real-time operation without shutting down the system for updates. Such functions can be added to a system through the use of a "controller-bot" to take a function template and implement the function template in a communication system to manage the triggers that will invoke the associated function from the FaaS cloud. An example of the FaaS system and method can include an implementation as described below:

1. Setup Controller-Bot

If a Controller-Bot is set up, a user can go directly to "Enable FaaS"

1.1. Elevate LPA (LPAdmin Access)

A. Click on Server Commands

B. Scroll to LPAdmin Access, choose the right server in the second column where the account can be running C. Enter an account-number after site=in the third column (e.g., site=1e63413568)

D. Follow the displayed steps 1.2. Enable Controller-Bot

A. This step can be performed after step 1.1 because of the elevated LPA

B. Choose Controller Bot in the Navigation

C. Click on ENABLE ON ACCOUNT

D. Choose tab Configuration→CONFIGURATION CHECK and click ENABLE ALL

Once the controller bot is enabled in the system, new actions in the system will be analyzed by the controller bot to check for triggers from an associated function template implemented by the controller bot. When the trigger is identified, the function path (e.g., location 830) is used to facilitate execution of code for the function in a FaaS cloud (e.g., FaaS cloud 190) portion of a services cloud (e.g., services cloud 180).

FIG. 10 illustrates an example of a user interface 1000 for creating a new function, in accordance with some examples. A new function can be created by the FaaS platform user interface by using "Messaging xxx" templates. The FaaS platform user can either be a system administrator for the communication system (e.g., associated with CMS 150), or a client or merchant of the communication system. One or more functions per template-type can be generated. If there are multiple types of functionality that stem from the same event invocation, these functionalities can be coded into the same lambda. Once the new function is generated and stored, the core information for an associated template, including an associated header (e.g., header 810), a name (e.g., name 820, and a storage location (e.g., location 830) are available for the function to be included in a function template. In some examples, the same function can be used in multiple different function templates, with the different function templates having different control settings and/or different triggers.

Figure 11:
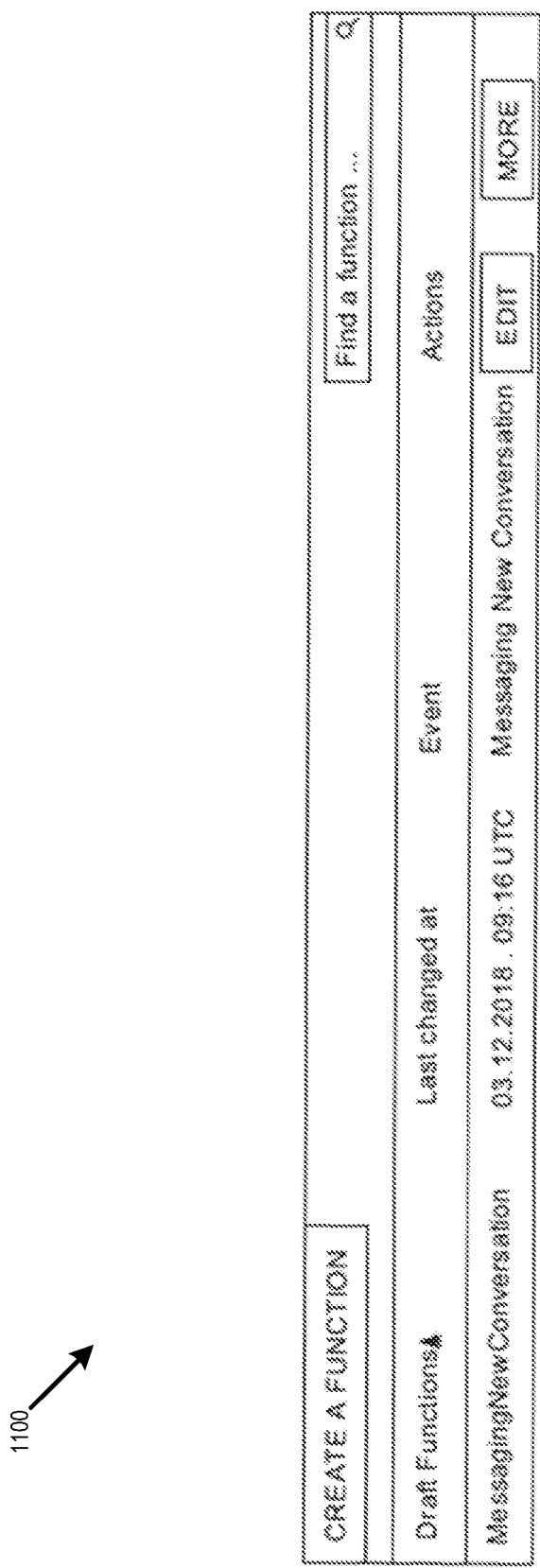
FIG. 11 illustrates an example of editing and creation of a function template in accordance with aspects of the present technology.

FIG. 11 illustrates an example of a user interface 1100 for editing or creating a function, such as the new function of FIG. 10, in accordance with some examples. Function implementation can include adjusting the coding from the template according to requirements by modifying the function. User interface allows searching of functions from the available functions stored in a system. For example, functions can be searched by the organization structure in a header, by name, by triggers or control settings in existing function templates, or by any other such use. In some examples, a system can store use information in a database, both for use in machine learning, as well as for searching as part of function editing. For example, a communication system can store the frequency with which a function is called, either in absolute terms (e.g., calls per day) or as a percentage of communications in a system over a given period (e.g., 50% of communications associated with merchant A have called function XYZ in the past month). Such function usage data can be used to search and sort available functions, as well as to provide machine learning or AI feedback as described herein.

Figure 12:
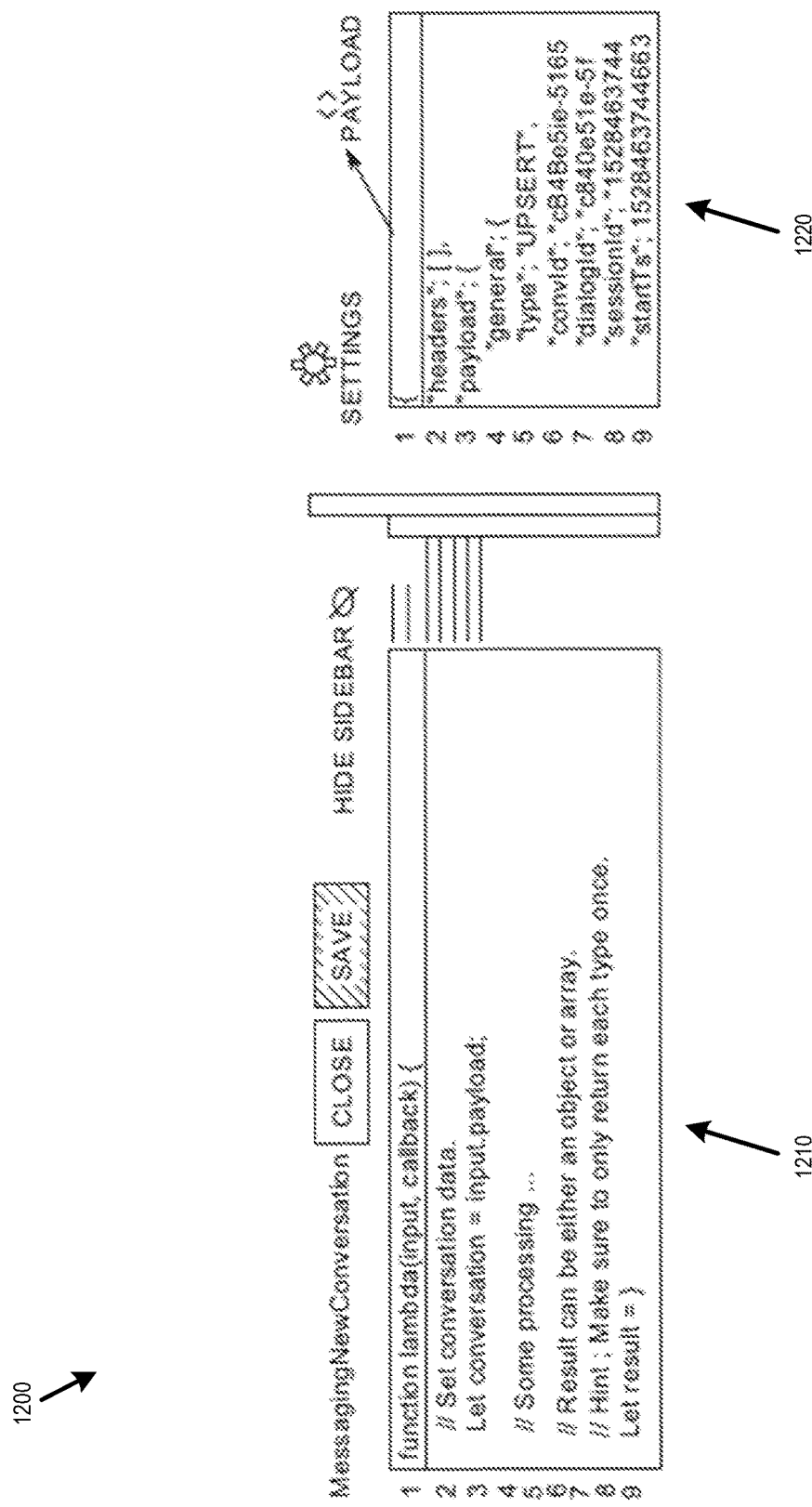
FIG. 12 illustrates aspects of a two-way communication in accordance with aspects of the present technology.

FIG. 12 illustrates an example user interface 1200 of a conversation, in accordance with some examples. On the left side, data 1210 associated with a conversation is illustrated. On the right side, an example of payload data 1220 is illustrated (e.g., a sidebar shows the payload). The payload data can include information about the conversation, or any other such information. The result can be a single command or an array of commands. In the template code, the current available commands are shown.

Figure 13:
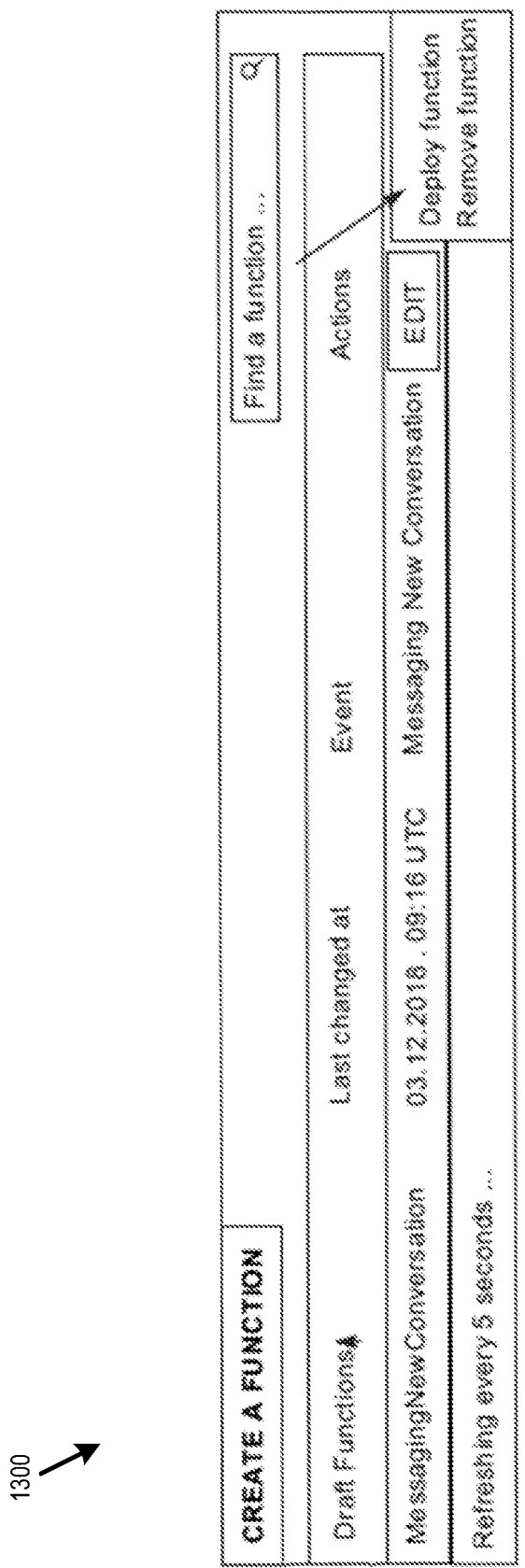
FIG. 13 illustrates aspects of function deployment and removal, in accordance with aspects of the present technology.

FIG. 13 illustrates an example user interface 1300 for deploying and removing a function, in accordance with some examples. An example of deploy function is illustrated and can deploy a new function with the FaaS platform by clicking MORE and Deploy functions. After successful deployment of the function, the deployed function can be called by the Controller-Bot in the corresponding event.

The disclosed single entry dual functionality system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

The above described user interfaces improve the operation of a computing device in a two-way communication system by enabling efficient dynamic deployment of functions as described herein within the communication system. Such a communication system can be structured to manage thousands of types of communications for many different clients, each with different communication goals and functions. By integrating, creation, search, editing, and deployment controls in the described interfaces, efficient management of bots, triggers, and functions in such a communication system is enabled, along with the use of the FaaS cloud to limit local resources and use on-demanding computing resources for complex environments with many (e.g., tens, hundreds, thousands, or more) functions with associated triggers operating in a communication system.

In some examples, such user interfaces can be embodied in a computing device comprising a display screen, the computing device being configured to display on the screen an interface in accordance with the examples above. Such user interfaces can include a display on the screen of a summary of data associated with a function, function template, bot controller, or any such aspect of the examples described above. The summary of data can be used to directly access instructions for a function to allow modification of the function for dynamic and real-time updates to a communication system. Such user interfaces can additionally include data for generating a function, template, bot controller, or other such element associated with a function, and for causing the communication system to be dynamically updated to use the function. Additionally, any other such interface described above can be implemented as part of such an embodiment.

Figure 14:
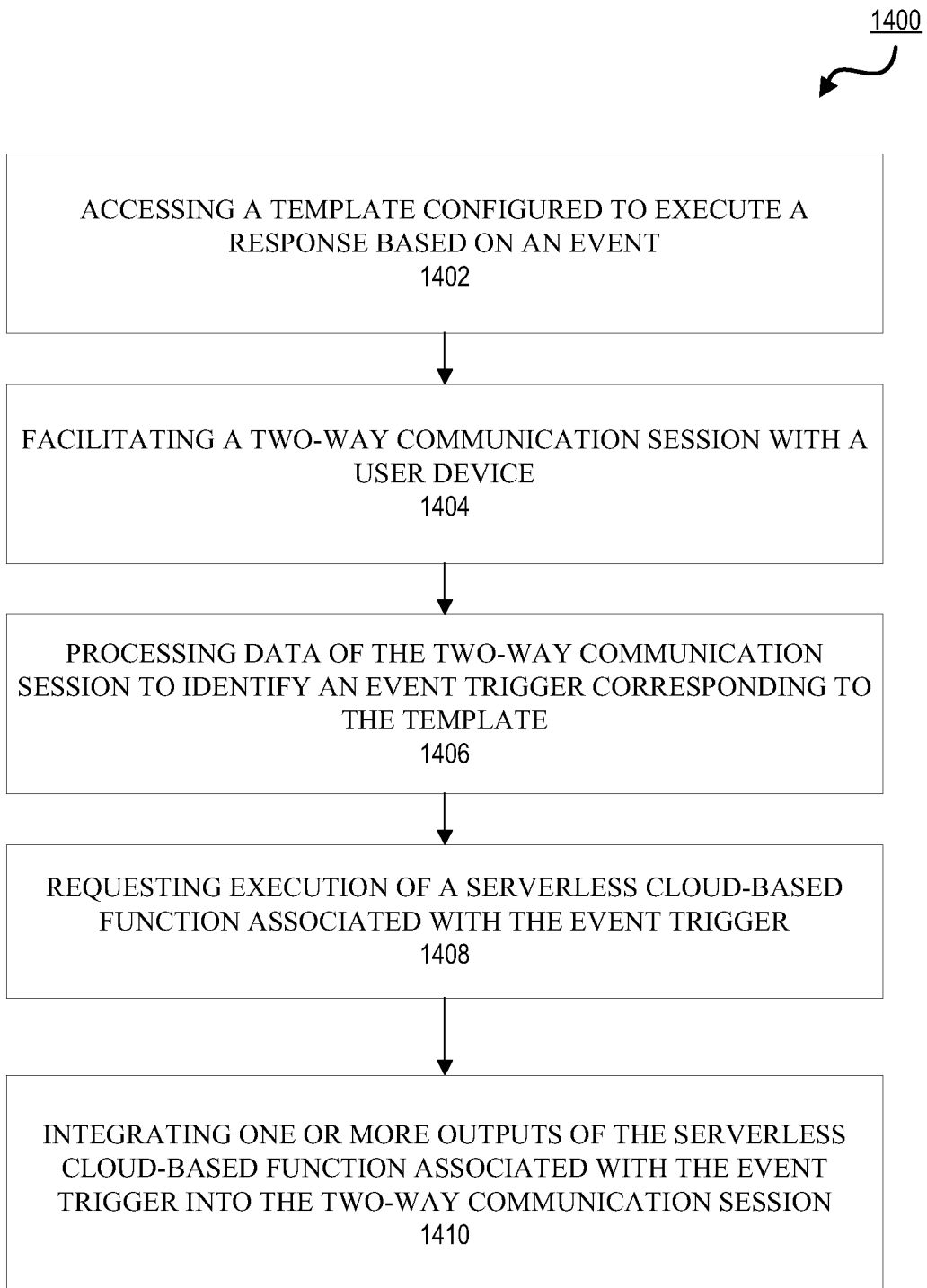
FIG. 14 shows a flowchart of a method embodiment in accordance with some aspects of the present technology.

FIG. 14 shows a flowchart of a method embodiment in accordance with some aspects of the present technology. The described method describes an embodiment of analyzing an intent. In some examples, method 1400 is performed by a computing device. In some examples, method 1400 is embodied as instructions that, when executed by one or more processors of a device, cause the device to perform the operations of method 1400.

Method 1400 includes step 1402 for accessing a template configured to execute a response based on an event. As described above, the template can be a template similar to function template 800 with a function identified by a location (e.g., location 830) and any other associated data that can be used by the system. In some examples, the accessing is used to initiate a controller bot that is implemented by a device to analyze data or actions in a communication system to match triggers of the function template to occurrences within the communication system.

Method 1400 includes step 1404 for facilitating a two-way communication session with a user device. Such a two-way communication session may occur when a user initiates a communication with an intent associated with a merchant or other communication system client. Such an intent may be to make a purchase, identify information, schedule an appointment, receive technical support, or any other such intent. The two-way communication can include text communications, audio communications, any other type of communication, or any combination of any such communications.

Method 1400 includes step 1406 for processing data of the two-way communication session to identify an event trigger corresponding to the template. For example, as described above, a controller bot or other mechanism within a communication can analyze events within a system (e.g., elements of a communication or actions supporting the communication in the system) for the trigger associated with the template of step 1402.

Method 1400 includes step 1408 requesting execution of a serverless cloud-based function associated with the event trigger. Such a serverless cloud-based function can involve execution of instructions for a function previously stored in a FaaS cloud, or sent to an FaaS cloud with the request. The FaaS cloud executes the instructions and generates one or more outputs that can be used to enhance the two-way communication session.

Method 1400 includes step 1410 for integrating one or more outputs of the serverless cloud-based function associated with the event trigger into the two-way communication session. The enhancement based on the outputs from the FaaS cloud can include improving the substance of a communication, improving operation of the communication system, identifying a new agent or node to be included in the communication, generating data to be used in the communication or data describing the communication (e.g., for later analysis or machine learning), or for any other such purpose. The method 1400 allows many functions or complex functions to be used by leveraging serverless cloud-based resources to improve communication system operations efficiently. By contrast, a server based system either limits the available functions to prevent over commitment of resources to the communication system, or is inefficient in the use of resources to provide equivalent functions to what can be achieved by the described serverless cloud-based structure.

Some such examples can further operate by terminating execution of the serverless cloud-based function based on a termination of the two-way communication session. Similarly, some examples can further operate by processing data of the two-way communication session to identify a function termination trigger corresponding to the serverless cloud-based function and terminating the serverless cloud-based function based on the function termination trigger. Just as the serverless cloud-based system provides enhanced function availability as described above, system inefficiency is avoided by terminating function execution when the function is not needed, allowing cloud-based resources to be reallocated to other functions or other uses.

In some examples, method 1400 can operate where requesting the serverless cloud-based function includes transmitting code associated with the serverless cloud-based function, wherein when the code is received at a serverless provider, the serverless provider executes the code to generate the one or more outputs of the serverless cloud-based function. In other examples, requesting the serverless cloud-based function associated with the event trigger further comprises transmitting a request, wherein when the request is received at a function-as-a-service platform, the function-as-a-service platform generates the one or more outputs. In further examples, other actions can be taken in response to such a request.

In some examples of method 1400, the template includes contact center data for a contact center associated with the two-way communication session and a terminal device associated with an agent.

In other examples, method 1400 further comprises receiving configuration settings associated with a client system, the configuration settings selecting one or more templates including the template and one or more event triggers corresponding to the one or more templates and automatically associating the one or more templates with two-way communication sessions associated with the client system.

Any such examples can further comprise facilitating connection of the user device to a terminal device associated with an agent, where the event trigger is communication data indicating a switch from an automated agent to a human agent, and wherein the one or more outputs indicate the agent and the terminal device. Any such example above can further include repeated steps or intermediate steps. Method 1400 therefore describes one example along with variations specifically included above, but other methods are also contemplated in accordance with the various examples and descriptions included herein.

Further, in various implementations, the above systems can be integrated with AI and machine learning elements. Such elements can be dynamically and continuously updated in real-time (e.g. as processed given resource limits) to provide improvements in system performance and system use. Such examples improve the operations of a communication system by providing information on the performance of the system and allowing errors or improvements in the system to be identified. Such elements additional improve the operations of a communication system by facilitating updates for added functionality and actions in response to identifying function use in a FaaS system and dynamically selecting function templates and resource allocations based on patterns identified by AI or machine learning systems. Further, the AI and machine learning systems above provide improvements to the performance of the devices beyond the described improvements solely from FaaS system operation. Such further improvements include increased responsive performance and reduction of processing resources that are wasted functions are inefficiently called or serverless cloud resources for the FaaS system are allocated inefficiently. The described improvements in dynamic allocation for function resources as well as in function selection improves the efficiency of the involved computing devices, saving power and system resources while providing communication and processing utility to users on behalf of system clients.

While various steps are described above, it will be apparent that certain steps can be repeated, and intervening steps can be performed as well. Additionally, different devices in a system will perform corresponding steps, and various devices can be performing multiple steps simultaneously. For example, a device can perform such steps to route requests to multiple agents simultaneously, with devices of multiple different agents performing corresponding operations, and the agent devices communicating with user devices.

Figure 15:
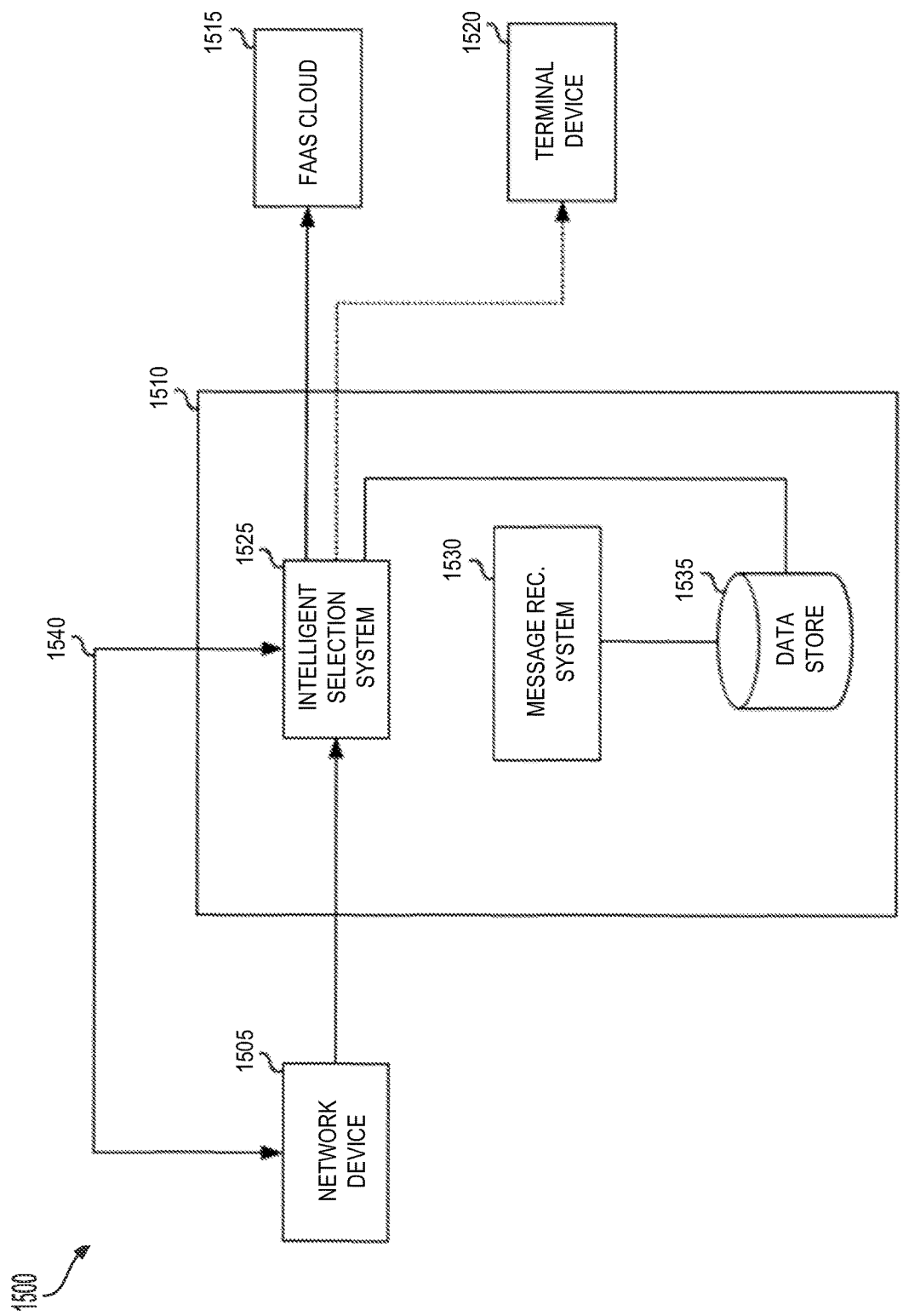
FIG. 15 shows a block diagram representing a network environment for enhancing embodiments described herein using machine-learning techniques.

FIG. 15 shows a block diagram representing network environment 1500 for function selection (e.g., associations between triggers and functions in a FaaS cloud system) using machine-learning techniques. Network environment 1500 may include network device 1505 (operated by a user) communication server 1510, FaaS cloud 1515 (e.g., such as FaaS cloud 190 in services cloud 180) and terminal device 1520. Communication server 1510 can facilitate the use of at least one function from FaaS 1515 in a two way communication between network device 1505 and terminal device 1520.

Communication server 1510 may include intelligent selection system 1525, message recommendation system 1530, and message data store 1535. Each of intelligent selection system 1525 and message recommendation system 1530 may include one or more computing devices with a processor and a memory that execute instructions to implement certain operations. In some implementations, intelligent selection system 1525 may be a bot configured to manage repeated feedback data from functions selected during two way communications. The feedback can be used to determine whether the selected and used function(s) in previous two way communications were the best functions for a given trigger, or if a different selected function for a given trigger can provided improved results. As part of such feedback operations, the triggers in a system described above can be dynamically updated, such that the function for a given trigger at any time is based on the feedback results up to that time, and the function selected may be altered or refined as additional feedback is received over time. As part of analysis to manage and use such feedback, intelligent selection system 1525 can, in some embodiments, manage A/B testing, where multiple functions are associated with a trigger, and the different functions are randomly assigned for incoming trigger requests. Results data derived from this A/B testing can determine which function provides superior results. For example, a trigger may be associated with input text "calendar please." In a basic example, a single associated function from FaaS cloud 1515 may provide a list of scheduled appointments associated with a network device 1505. Feedback received over time may cause an initial function from FaaS cloud 1515 to be changed to an appointment creation function. The A/B example may randomly assign different network device(s) 1505 to either the schedule reporting function or the appointment creation function based on the "calendar please" trigger, and then select the function that provides superior results in the system. If network device preferences shift over time, thresholds can be established to repeat A/B testing, or to automatically initiate testing with additional other functions, or multiple different functions (e.g., A/B/C or more functions in a single test). Such criteria for automatically reassessing an association between a function and a trigger can be, for example, if a user (e.g., of network device(s) 1505) provide feedback scores that fall below a certain level, or if two way communications are identified as providing a different function more than a threshold percentage of the time following receipt of the "calendar please" trigger.

Intelligent selection system 1525 may include one or more processors configured to execute code that causes one or more machine-learning techniques or artificial intelligence techniques to intelligently select associations between trigger inputs and functions. As described above, triggers can be identified from text (e.g., with natural language processing, etc.) or from actions taken by a system (e.g., initiation of a two way communication, identification of certain routing paths or system loads, repeated two-way communications with a single network device 1505, etc.). In some implementations, intelligent selection system 1525 can execute one or more machine-learning techniques to train a model that predicts whether a message received from network device 1505 may be successfully addressed by a given function in FaaS cloud 1515.

As another non-limiting example, intelligent selection system 1525 may receive a message from network device 1505 through a communication channel established or facilitated by communication server 1510 (e.g., a native application configured to enable users to communicate with each other across various devices). Intelligent selection system 1525 may evaluate the incoming message according to certain embodiments described above. For example, intelligent selection system 1525 may evaluate the content (e.g., text, audio clips, images, emoticons, or other suitable content) included in the received message using a trained machine-learning model. The content of the message can be inputted into the machine-learning model to generate a predicted function (e.g., a particular terminal device or bot) or to verify that a predicted function is the same function currently associated with a trigger for the content. The machine-learning model may be continuously trained based on feedback signal 1540 received from network device 1505. In some implementations, intelligent selection system 1525 may request an acknowledgement from network device 1505 of the predicted function. As a non-limiting example, intelligent selection system 1525 may evaluate the message using a machine-learning technique, and a result of the evaluation may include a function to route or reroute a two way communication (e.g., a predication that a particular function or bot within FaaS 1515 to be associated with a message). To confirm, intelligent selection system 1525 may automatically request feedback signal 1540. For example, feedback signal 1540 may include a request for network device 1505 to acknowledge whether the identified function is correctly associated with for the message (e.g., "Is Technical Support the correct destination?"). If network device 1505 transmits an acknowledgement, then intelligent selection system 1525 may train the machine-learning model to predict that future messages including the exact or similar content (e.g., a threshold of similarity, such as 10 percent difference in content) as the received message are to be associated with the selected function. However, if intelligent selection system 1525 receives feedback signal 1540 indicating that there is an issue with the identified intelligent selection system 1525 can train the machine-learning model that future messages with the given trigger be associated with a different function or bot of FaaS cloud 1515. In some implementations, intelligent selection system 1525 may not immediately update or train the machine-learning model, but rather, intelligent selection system 1525 may wait for a threshold number of incorrect functions, or a threshold set of feedback, before making updates.

Message data store 1535 may store some (e.g., but not all) or all messages received in the past from one or more network devices. Further, message data store 1535 may also store some or all messages transmitted by terminal devices or bots during previous communication sessions with network devices. Message data store 1535 may also store some or all messages transmitted by network devices to bots during communication sessions. Further, message data store 1535 may store some or all messages transmitted by bots to network devices during communication sessions. In some implementations, message data store 1535 may be a database of all messages processed (e.g., transmitted by or received at) communication server 1510.

Message recommendation system 1530 may analyze the database of messages stored at message data store 1535. In some implementations, message recommendation system 1530 may evaluate the messages stored at message data store 1535 using one or more machine-learning algorithms or artificial intelligence algorithms. For example, message recommendation system 1530 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 1535. In some implementations, a recurrent neural network (RNN) or a convolutional neural network (CNN) may be used to predict response messages to assist the agent. In some implementations, message recommendation system 1530 may use support vector machines (SVM), supervised, semi-supervised, ensemble techniques, or unsupervised machine-learning techniques to evaluate all previous messages to predict responses to incoming messages received from network devices during communication sessions. The message recommendation system can, in some such examples, automatically generate new triggers and associated functions. For example, message recommendation system 1530 may evaluate the content of messages received from network devices (or messages received at communication server 1510 from bots or terminal devices) and compare the results of the evaluation to the one or more clusters of previous messages or sets of messages for two way communications sessions and the functions used during those sessions stored in message data store 1535. Once the cluster is identified, message recommendation system 1530 can identify the most relevant responses or functions for given triggers. Such a system can automatically use data from manual (e.g., agent based) function selection, to generate new triggers with associated functions based on the functions selected by agents during historical communication session (e.g., as stored in data store 1535. Message recommendation system 1530 can select one or more triggers and associated functions within the cluster of messages based on a confidence threshold. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms.

Figure 16:
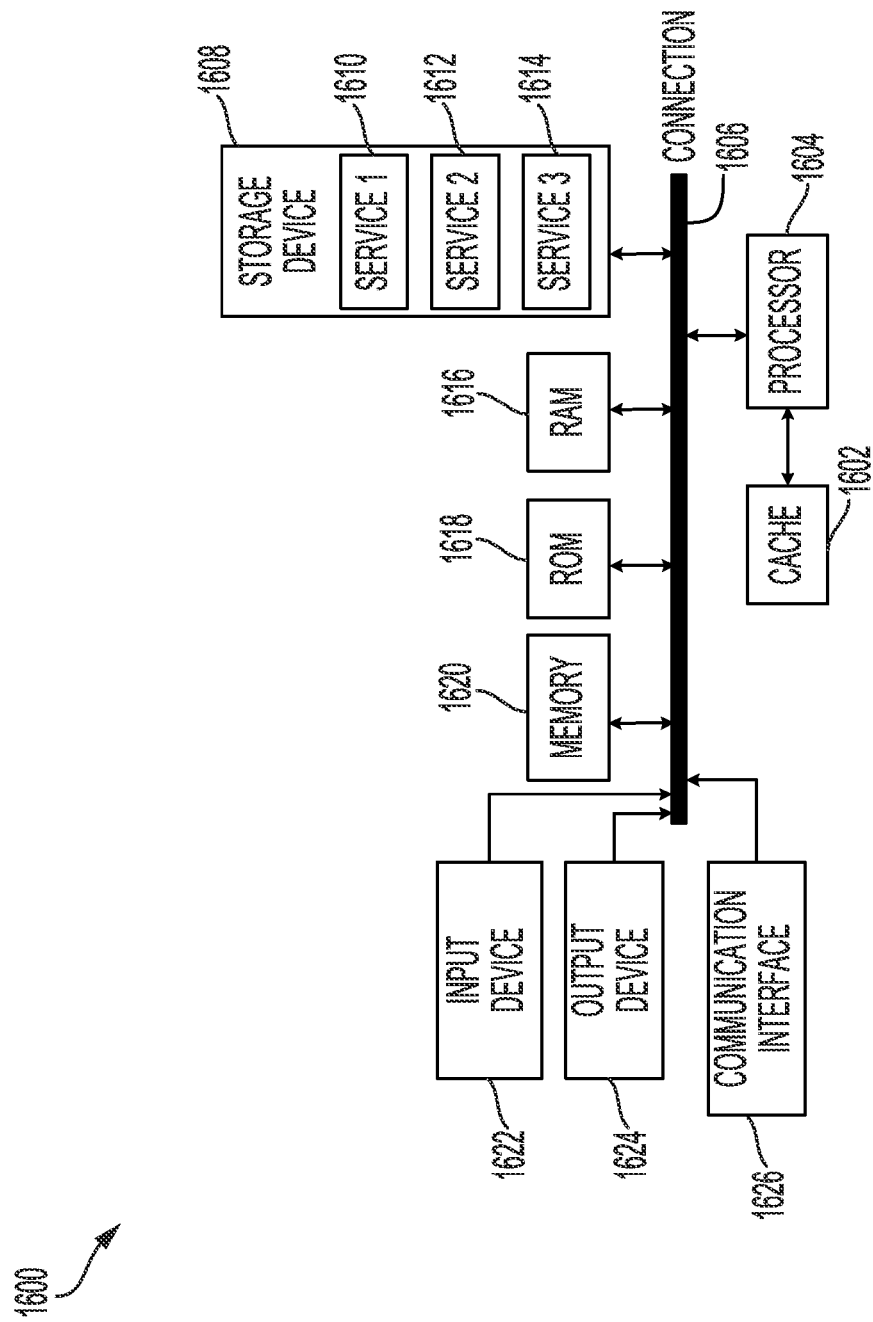
FIG. 16 illustrates an example computing device that can be used to implement aspects of an intent driven communication systems in accordance with some implementations of the present technology.

FIG. 16 illustrates a computing system architecture 1600 including various components in electrical communication with each other using a connection 1606, such as a bus, in accordance with some implementations. Example system architecture 1600 includes a processing unit (CPU or processor) 1604 and a system connection 1606 that couples various system components including the system memory 1620, such as ROM 1618 and RAM 1616, to the processor 1604. The system architecture 1600 can include a cache 1602 of high-speed memory connected directly with, in close proximity to, or integrated as part of the processor 1604. The system architecture 1600 can copy data from the memory 1620 and/or the storage device 1608 to the cache 1602 for quick access by the processor 1604. In this way, the cache can provide a performance boost that avoids processor 1604 delays while waiting for data. These and other modules can control or be configured to control the processor 1604 to perform various actions.

Other system memory 1620 may be available for use as well. The memory 1620 can include multiple different types of memory with different performance characteristics. The processor 1604 can include any general purpose processor and a hardware or software service, such as service 1 1610, service 2 1612, and service 3 1614 stored in storage device 1608, configured to control the processor 1604 as well as a special-purpose processor where software instructions are incorporated into the actual processor design. The processor 1604 may be a completely self-contained computing system, containing multiple cores or processors, a bus, memory controller, cache, etc. A multi-core processor may be symmetric or asymmetric.

To enable user communication with the computing system architecture 1600, an input device 1622 can represent any number of input mechanisms, such as a microphone for speech, a touch-sensitive screen for gesture or graphical input, keyboard, mouse, motion input, speech and so forth. An output device 1624 can also be one or more of a number of output mechanisms known to those of skill in the art. In some instances, multimodal systems can enable a user to provide multiple types of input to communicate with the computing system architecture 1600. The communications interface 1626 can generally govern and control the user input and system output. There is no restriction on operating on any particular hardware arrangement and therefore the basic features here may easily be substituted for improved hardware or firmware arrangements as they are developed.

Storage device 1608 is a non-volatile memory and can be a hard disk or other types of computer readable media which can store data that are accessible by a computer, such as magnetic cassettes, flash memory cards, solid state memory devices, digital versatile disks, cartridges, RAMs 1616, ROM 1618, and hybrids thereof.

The storage device 1608 can include services 1610, 1612, 1614 for controlling the processor 1604. Other hardware or software modules are contemplated. The storage device 1608 can be connected to the system connection 1606. In one aspect, a hardware module that performs a particular function can include the software component stored in a computer-readable medium in connection with the necessary hardware components, such as the processor 1604, connection 1606, output device 1624, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form. As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform as events occur or in batch mode aggregating multiple events, such as over one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file routing system, such as a disk operating system. One example of operating system software with associated file routing system software is the family of operating systems known as Windows® from Microsoft Corporation of Redmond, Wash., and their associated file routing systems. Another example of operating system software with its associated file routing system software is the Linux™ operating system and its associated file routing system. The file routing system can be stored in the non-volatile memory and/or drive unit and can cause the processor to execute the various acts involved by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless ally stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The involved structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

In general, the routines executed to implement the implementations of the disclosure, may be implemented as part of an operating system or an application, component, program, object, module or sequence of instructions referred to as "computer programs." The computer programs typically include one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may include a transformation, such as a physical transformation. With particular types of memory devices, such a physical transformation may include a physical transformation of an article to a different state or thing. For example, but without limitation, for some types of memory devices, a change in state may involve an accumulation and storage of charge or a release of stored charge. Likewise, in other memory devices, a change of state may include a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may include a transformation, such as a physical transformation. Rather, the foregoing is intended as illustrative examples.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any characteristics, features, or aspects of the disclosure with which that terminology is associated. In general, the terms used in the following claims should not be construed to limit the disclosure to the implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 152(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object including a computer-readable medium containing computer program code, which can be executed by a computer processor for performing any or all of the steps, operations, or processes described.

Examples may also relate to an apparatus for performing the operations herein. This apparatus may be specially constructed for the involved purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may include information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

details were given in the preceding description to provide a thorough understanding of various implementations of systems and components for a contextual connection system. It will be understood by one of ordinary skill in the art, however, that the implementations described above may be practiced without these details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The program code may be executed by a processor, which may include one or more processors, such as one or more digital signal processors (DSPs), general purpose microprocessors, an application integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The foregoing detailed description of the technology has been presented for purposes of illustration and description. It is not intended to be exhaustive or to limit the technology to the precise form disclosed. Many modifications and variations are possible in light of the above teaching. The described examples were chosen in order to best explain the principles of the technology, its practical application, and to enable others skilled in the art to utilize the technology in various examples and with various modifications as are suited to the particular use contemplated. It is intended that the scope of the technology be defined by the claim.

What is claimed is:

1. A computer-implemented method comprising:
   accessing a template configured to execute a response based on an event;
   facilitating a two-way communication session with a user device, wherein the two-way communication session includes a natural language communication;
   processing data of the two-way communication session to identify an event trigger corresponding to the template;
   requesting execution of a serverless cloud-based function associated with the event trigger, wherein requesting the serverless cloud-based function includes transmitting code associated with the serverless cloud-based function; and
   integrating one or more outputs of the serverless cloud-based function associated with the event trigger into the two-way communication session, wherein when the code is received at a serverless provider, the serverless provider executes the code to generate the one or more outputs of the serverless cloud-based function.

2. The computer-implemented method of claim 1, further comprising:
   terminating execution of the serverless cloud-based function based on a termination of the two-way communication session.

3. The computer-implemented method of claim 1, further comprising:
   processing data of the two-way communication session to identify a function termination trigger corresponding to the serverless cloud-based function; and
   terminating the serverless cloud-based function based on the function termination trigger.

4. The computer-implemented method of claim 1, wherein requesting the serverless cloud-based function associated with the event trigger further comprises:
   transmitting a request, wherein when the request is received at a function-as-a-service platform, the function-as-a-service platform generates the one or more outputs.

5. The computer-implemented method of claim 1, wherein the template includes contact center data for a contact center associated with the two-way communication session and a terminal device associated with an agent.

6. The computer-implemented method of claim 1, further comprising:

receiving configuration settings associated with a client system, the configuration settings selecting the template and one or more event triggers corresponding to the template; and automatically associating the template with two-way communication sessions associated with the client system.

7. The computer-implemented method of claim 1, further comprising:

facilitating connection of the user device to a terminal device associated with an agent, wherein the event trigger is communication data indicating a switch from an automated agent to a human agent, and wherein the one or more outputs indicate the agent and the terminal device.

8. The computer-implemented method of claim 1, wherein the code associated with the serverless cloud-based function includes custom logic to develop a conversational experience for the two-way communication session in response to a conversation started event.

9. The computer-implemented method of claim 1, wherein the code associated with the serverless cloud-based function includes custom logic to develop a conversational experience for the two-way communication session in response to a survey submitted event.

10. The computer-implemented method of claim 1, wherein the code associated with the serverless cloud-based function provides real-time natural language processing for a specialized topic associated with the two-way communication session.

11. A system comprising:

a memory; and one or more processors coupled to the memory and configured to perform operations comprising:

accessing a template configured to execute a response based on an event;

facilitating a two-way communication session with a user device, wherein the two-way communication session includes a natural language communication;

processing data of the two-way communication session to identify an event trigger corresponding to the template;

requesting execution of a serverless cloud-based function associated with the event trigger, wherein requesting the serverless cloud-based function includes transmitting code associated with the serverless cloud-based function; and integrating one or more outputs of the serverless cloud-based function associated with the event trigger into the two-way communication session, wherein when the code is received at a serverless provider, the serverless provider executes the code to generate the one or more outputs of the serverless cloud-based function.

12. The system of claim 11, further comprising:

terminating execution of the serverless cloud-based function based on a termination of the two-way communication session.

13. The system of claim 11, further comprising:

processing data of the two-way communication session to identify a function termination trigger corresponding to the serverless cloud-based function; and terminating the serverless cloud-based function based on the function termination trigger.

14. The system of claim 11, wherein requesting the serverless cloud-based function associated with the event trigger further comprises:

transmitting a request, wherein when the request is received at a function-as-a-service platform, the function-as-a-service platform generates the one or more outputs.

15. The system of claim 11, wherein the template includes contact center data for a contact center associated with the two-way communication session and a terminal device associated with an agent.

16. The system of claim 11, further comprising:

receiving configuration settings associated with a client system, the configuration settings selecting the template and one or more event triggers corresponding to the template; and automatically associating the template with two-way communication sessions associated with the client system.

17. The system of claim 11, further comprising:

facilitating connection of the user device to a terminal device associated with an agent, wherein the event trigger is communication data indicating a switch from an automated agent to a human agent, and wherein the one or more outputs indicate the agent and the terminal device.

18. A non-transitory computer readable medium comprising instructions that, when executed by one or more processors of a device, cause the device to perform operations comprising:

accessing a template configured to execute a response based on an event;

facilitating a two-way communication session with a user device, wherein the two-way communication session includes a natural language communication;

processing data of the two-way communication session to identify an event trigger corresponding to the template;

requesting execution of a serverless cloud-based function associated with the event trigger, wherein requesting the serverless cloud-based function includes transmitting code associated with the serverless cloud-based function; and integrating one or more outputs of the serverless cloud-based function associated with the event trigger into the two-way communication session, wherein when the code is received at a serverless provider, the serverless provider executes the code to generate the one or more outputs of the serverless cloud-based function.

19. The non-transitory computer readable medium of claim 18, wherein the instructions further cause the device to perform operations comprising:

terminating execution of the serverless cloud-based function based on a termination of the two-way communication session.

20. The non-transitory computer readable medium of claim 18, wherein the instructions further cause the device to perform operations comprising:

processing data of the two-way communication session to identify a function termination trigger corresponding to the serverless cloud-based function; and terminating the serverless cloud-based function based on the function termination trigger.

21. The non-transitory computer readable medium of claim 18, wherein requesting the serverless cloud-based function associated with the event trigger further comprises:

transmitting a request, wherein when the request is received at a function-as-a-service platform, the function-as-a-service platform generates the one or more outputs.

22. The non-transitory computer readable medium of claim 18, wherein the template includes contact center data for a contact center associated with the two-way communication session and a terminal device associated with an agent.

23. The non-transitory computer readable medium of claim 18, wherein the instructions further cause the device to perform operations comprising:
   receiving configuration settings associated with a client system, the configuration settings selecting the template and one or more event triggers corresponding to the template; and
   automatically associating the template with two-way communication sessions associated with the client system.

24. The non-transitory computer readable medium of claim 18, wherein the instructions further cause the device to perform operations comprising:
   facilitating connection of the user device to a terminal device associated with an agent, wherein the event trigger is communication data indicating a switch from an automated agent to a human agent, and wherein the one or more outputs indicate the agent and the terminal device.

* * * * *